United States Patent
Paduroiu

(10) Patent No.: US 11,347,568 B1
(45) Date of Patent: May 31, 2022

(54) CONDITIONAL APPENDS IN AN ORDERED EVENT STREAM STORAGE SYSTEM

(71) Applicant: EMC IP Holding Company LLC, Hopkinton, MA (US)

(72) Inventor: Andrei Paduroiu, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/127,724

(22) Filed: Dec. 18, 2020

(51) Int. Cl.
G06F 9/54 (2006.01)
G06F 9/50 (2006.01)
G06F 11/34 (2006.01)
G06F 15/173 (2006.01)

(52) U.S. Cl.
CPC ............ G06F 9/542 (2013.01); G06F 9/5072 (2013.01); G06F 11/3409 (2013.01); G06F 11/3476 (2013.01); G06F 15/173 (2013.01); G06F 2209/508 (2013.01)

(58) Field of Classification Search
None
See application file for complete search history.

(56) References Cited

U.S. PATENT DOCUMENTS

| | | |
|---|---|---|
| 3,617,587 A | 11/1971 | Nayar et al. |
| 5,826,977 A | 10/1998 | Fowler et al. |
| 8,572,091 B1 | 10/2013 | Sivasubramanian et al. |
| 8,655,825 B2 | 2/2014 | Roesch et al. |
| 8,825,848 B1 | 9/2014 | Dotan et al. |
| 9,514,018 B2 | 12/2016 | Sikri |
| 9,639,589 B1 | 5/2017 | Theimer |

(Continued)

FOREIGN PATENT DOCUMENTS

| | | |
|---|---|---|
| CA | 2672879 | 4/2008 |
| CN | 1708029 | 12/2005 |

(Continued)

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

(Continued)

Primary Examiner — Charles E Anya
(74) Attorney, Agent, or Firm — Amin, Turocy & Watson, LLP

(57) ABSTRACT

Conditionally appending an event in an ordered event stream (OES) is disclosed. An OES storage system can comprise an OES that can have a dynamic topology, e.g., comprising changing numbers of segments, segments that have changing routing key ranges, mixes of local and remote storage devices and processors, employing different types of storage, or combinations thereof. A conditional append operation can be predicated on determining an appropriate segment, for example, based on a routing key. Conditions of the conditional appends can be designated by a user. Failing conditions can trigger a corrective action, throwing of an error. Satisfied conditions can result in permitting the conditional append. Moreover, the conditional append can be dependent on populating a group of attributes for the correct segment based on attributes that can be determined for a different epoch of the OES, again for example, based on a routing key.

20 Claims, 10 Drawing Sheets

(56) References Cited

U.S. PATENT DOCUMENTS

| | | |
|---|---|---|
| 9,753,932 B1 | 9/2017 | Brow et al. |
| 9,898,482 B1 | 2/2018 | Bono |
| 9,965,215 B1 | 5/2018 | Vazhenin et al. |
| 10,565,208 B2 | 2/2020 | Triou, Jr. et al. |
| 10,860,457 B1 | 12/2020 | Evenson |
| 10,867,033 B2 | 12/2020 | Keren et al. |
| 11,016,826 B2 | 5/2021 | Lehmann |
| 11,194,638 B1 | 12/2021 | Danilov et al. |
| 2004/0199524 A1 | 10/2004 | Rys et al. |
| 2005/0055519 A1 | 3/2005 | Stuart et al. |
| 2007/0220518 A1 | 9/2007 | Verbowski et al. |
| 2008/0184262 A1 | 7/2008 | Ginis et al. |
| 2008/0301135 A1 | 12/2008 | Alves et al. |
| 2009/0182784 A1 | 7/2009 | Rohit et al. |
| 2010/0083098 A1 | 4/2010 | Leme et al. |
| 2010/0125794 A1 | 5/2010 | Hampton et al. |
| 2011/0126099 A1 | 5/2011 | Anderson et al. |
| 2011/0131588 A1 | 6/2011 | Allam et al. |
| 2011/0249147 A1 | 10/2011 | Ishii |
| 2012/0102503 A1 | 4/2012 | Meijer et al. |
| 2012/0109985 A1* | 5/2012 | Chandrasekaran ........................ G06F 16/24544 707/754 |
| 2013/0226931 A1 | 8/2013 | Hazel et al. |
| 2013/0275808 A1 | 10/2013 | McNeeney et al. |
| 2014/0089264 A1 | 3/2014 | Talagala et al. |
| 2014/0223115 A1 | 8/2014 | Dinkjian et al. |
| 2015/0169449 A1 | 6/2015 | Barrell et al. |
| 2015/0172120 A1 | 6/2015 | Dwarampudi et al. |
| 2015/0341212 A1 | 11/2015 | Hsiao et al. |
| 2015/0363245 A1 | 12/2015 | Mutschler |
| 2016/0063080 A1 | 3/2016 | Nano et al. |
| 2016/0210061 A1 | 7/2016 | Soncodi et al. |
| 2016/0321287 A1 | 11/2016 | Luthra et al. |
| 2016/0337435 A1* | 11/2016 | Nigam .................. H04L 67/142 |
| 2016/0357476 A1 | 12/2016 | Chen et al. |
| 2017/0075832 A1 | 3/2017 | Bhimani et al. |
| 2017/0075947 A1 | 3/2017 | Kurilov et al. |
| 2017/0177263 A1 | 6/2017 | Das et al. |
| 2017/0212891 A1 | 7/2017 | Pundir et al. |
| 2018/0101842 A1 | 4/2018 | Ventura et al. |
| 2018/0121307 A1 | 5/2018 | Braun et al. |
| 2018/0176244 A1 | 6/2018 | Gervais et al. |
| 2018/0184138 A1 | 6/2018 | Shaw et al. |
| 2018/0329644 A1 | 11/2018 | Das et al. |
| 2018/0332325 A1* | 11/2018 | Kaitchuck ............... H04L 67/26 |
| 2018/0332365 A1 | 11/2018 | Kaitchuck et al. |
| 2018/0332366 A1 | 11/2018 | Paduroiu |
| 2018/0332367 A1* | 11/2018 | Kaitchuck ............. H04L 65/604 |
| 2018/0336256 A1 | 11/2018 | Li et al. |
| 2018/0345140 A1 | 12/2018 | Posin |
| 2019/0026301 A1 | 1/2019 | Wang et al. |
| 2019/0138494 A1 | 5/2019 | Inoue |
| 2019/0340180 A1 | 11/2019 | Barsness et al. |
| 2019/0349422 A1 | 11/2019 | Dhruvakumar et al. |
| 2020/0034468 A1 | 1/2020 | Lei et al. |
| 2020/0174695 A1 | 6/2020 | Bazarsky et al. |
| 2020/0250172 A1* | 8/2020 | Busjaeger ........... G06F 16/2365 |
| 2020/0320005 A1 | 10/2020 | Shulman et al. |
| 2020/0344299 A1 | 10/2020 | Sohail et al. |
| 2020/0394196 A1 | 12/2020 | Shivanna et al. |
| 2020/0404011 A1 | 12/2020 | Gervais et al. |
| 2021/0110328 A1 | 4/2021 | Hsiao et al. |
| 2021/0124746 A1 | 4/2021 | Klaedtke |
| 2021/0256029 A1 | 8/2021 | Danilov et al. |
| 2021/0342296 A1 | 11/2021 | Danilov et al. |
| 2021/0342354 A1 | 11/2021 | Danilov et al. |
| 2021/0365211 A1 | 11/2021 | Danilov et al. |
| 2022/0035533 A1 | 2/2022 | Danilov et al. |

FOREIGN PATENT DOCUMENTS

| | | |
|---|---|---|
| CN | 104901958 | 9/2015 |
| CN | 105591926 | 5/2016 |
| GB | 2377038 | 12/2002 |
| WO | 2002101585 | 12/2002 |
| WO | 2009014993 | 1/2009 |
| WO | 2015191120 | 12/2015 |
| WO | 2018148149 | 8/2018 |

OTHER PUBLICATIONS

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

Office Action dated Oct. 1, 2021 for U.S. Appl. No. 16/915,762, 57 pages.

Notice of Allowance dated Dec. 15, 2021 for U.S. Appl. No. 17/064,747, 54 pages.

Office Action dated Nov. 10, 2021 for U.S. Appl. No. 16/944,089, 75 pages.

Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Feb. 4, 2022 for U.S. Appl. No. 16/915,762, 57 pages.

(56) References Cited

OTHER PUBLICATIONS

Office Action dated Jan. 21, 2022 for U.S. Appl. No. 16/864,892, 26 pages.
Notice of Allowance dated Feb. 24, 2022 for U.S. Appl. No. 17/038,079, 55pgs.
Azhar et al., "Efficient selection of access control systems through multi criteria analytical hierarchy process", IEEE, doi:10.1109/ICET.2012.6375419, 2012, pp. 1-8. (Year: 2012).
Rox et al., "Construction and Deconstruction of Hierarchical Event Streams with Multiple Hierarchical Layers", IEEE, doi:10.1109/ECRTS.2008.13, 2008, pp. 201-210. (Year: 2008).
Notice of Allowance dated Feb. 18, 2022 for U.S. Appl. No. 17/083,145, 70pgs.
Office Action dated Mar. 21, 2022 for U.S. Appl. No. 16/864,905, 125 pgs.
Edi Muskardin et al., "Implementation of Hashing Algorithms in Stream Mining", International Conference on Smart Systems and Technologies (SST), Oct. 2018, pp. 233-238.
Notice of Allowance dated Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi:10.1109/LES.2014.2359154. (Year: 2014).
T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi:10.1109/IoTDI49375.2020.00014. (Year: 2020).
Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi:10.1109/RTCSA.2006.52. (Year: 2006).
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi:10.1109/ICDE.2009.95. (Year: 2009).
Office Action dated Apr. 20, 2022 for U.S. Appl. No. 16/944,094, 48 pages.
Office Action dated Apr. 12, 2022 for U.S. Appl. No. 17/038,102, 48 pages.

\* cited by examiner

CONDITIONAL APPENDS IN AN ORDERED EVENT STREAM STORAGE SYSTEM

TECHNICAL FIELD

The disclosed subject matter relates to data storage and, more particularly, to conditional appending of events to a segment of an ordered event stream (OES) of an OES storage system.

BACKGROUND

Conventional data storage techniques can employ an event stream, e.g., storing data corresponding to a stream of events in a logical order. In a conventional system, an event stream can provide for storing a generally unbounded stream of events whereby a portion of the stored events can then be read out in the order they were stored. One use of data storage is in bulk data storage.

DETAILED DESCRIPTION

Figure 1:
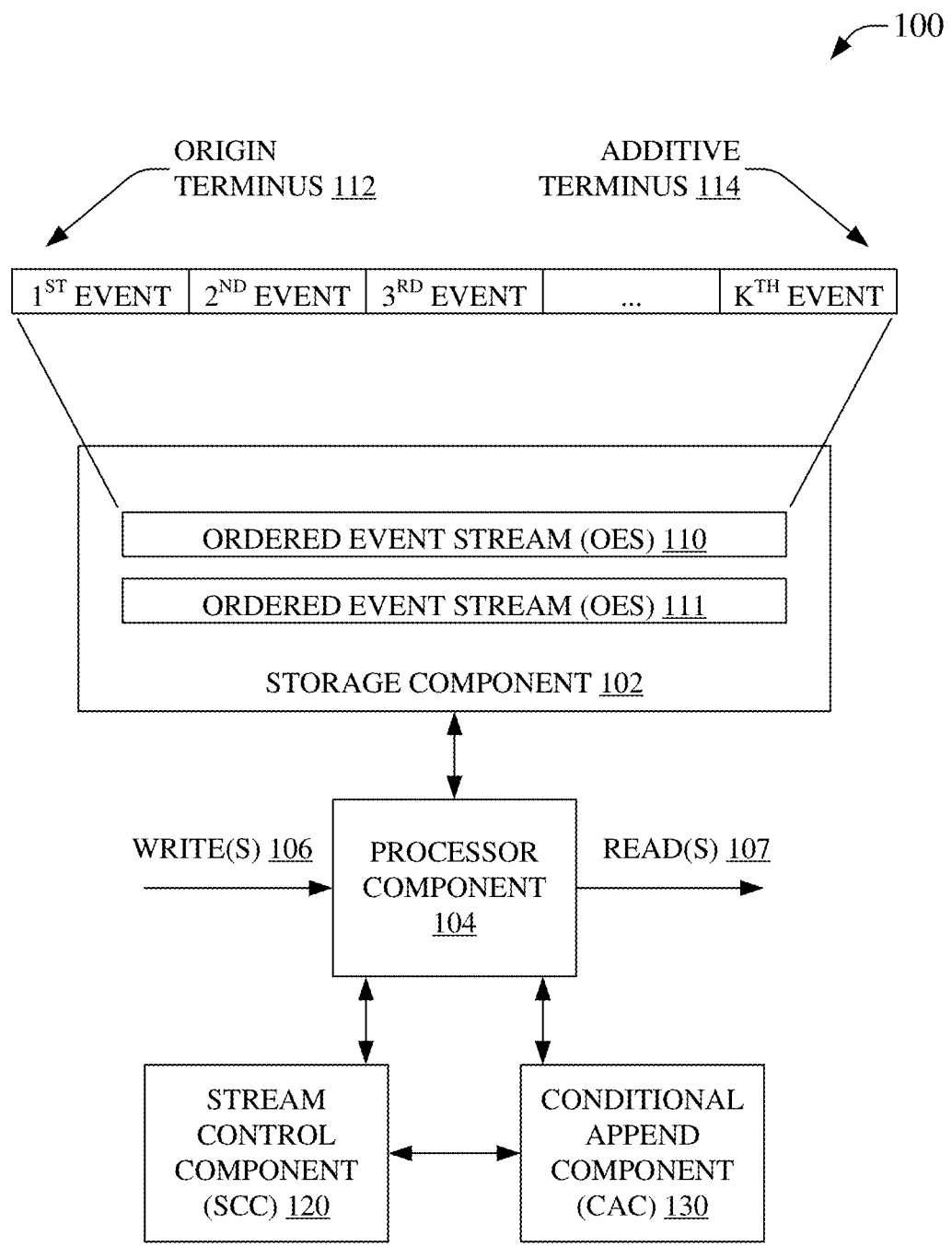
FIG. 1 is an illustration of an example system that can facilitate conditionally appending an event to a segment of an ordered event stream, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional event stream storage techniques, as mentioned, can provide for storing a generally unbounded stream of events whereby a portion of the stored events can then be read out in the order they were stored. Generally, stream storage is rudimentary, e.g., a stream is stored in a single location and is typically not scalable, which can provide for relatively transparent decision making in relation to permitting an event to be added to a conventional stream.

However, where stream storage is less rudimentary, conventional approaches to permissive appends of events to a stream can fail and novel technology, such as is disclosed in the instant application, can be needed to facilitate conditional appends. In an aspect, modern stream storage, for example STREAMING DATA PLATFORM (SDP) by DELL EMC, PRAVEGA by DELL EMC, or another similar OES data storage system, can be scalable and an OES can therefore comprise one or more segments that can store ordered data, for example, according to a routing key, or other criterion. Moreover, different segments can be associated with different processors and, in embodiments, those processors can be located remotely from each other. Similarly, storage elements for different segments of an OES can also be located remotely from each other. As such, a modern OES can be regarded as being distributed in contrast to a conventional OES, e.g., the processing and storage of ordered data in a segment of a modern OES can be distributed across different physical locations. Moreover, the scalable nature of a modern OES can result in splitting of an existing segment into two or more new segments, contraction of two or more existing segments into one or more new segments, or other alterations of OES topology. The scaling can, for example, be responsive to changes in data ingestion patterns, cost of computing resource use, or other factors, e.g., the scaling can be dynamic. As such, a topology and/or distribution of an OES can be altered, often frequently. The dynamic nature of a modern OES storage system can complicate performing conditional appends.

A stream, e.g., an OES, can be a durable, elastic, append-only, unbounded sequence of events, wherein an event comprises event data that is to be stored via the OES. In an aspect, events, as disclosed herein, can be stored in a stream according to a routing key, hereinafter 'key,' which can be derived from data corresponding to an event. A modern OES, e.g., PRAVEGA, etc., can guarantee that an event(s) is typically durably stored once storage is acknowledged, and that events with a same routing key can typically be consumed from the OES in the order with which they were written to the OES. As such, presently disclosed data storage systems can enable access to events with a same routing key in an order in which those events are written into an ordered event stream.

An OES can be split into a set of shards or partitions generally referred to as stream segments, segments, etc. The segments can act as logical containers for events within the OES. Writing a new event to an OES, for example via a conditional append or other operation, can result in storing the event to one of the segments based on a corresponding routing key. In an aspect, a key can often be derived from data corresponding to the event, e.g., a "machine-id," "location," "device type," "customer number," "vehicle identifier, " "identified segment/OES," or other event related data. As such, events with a same routing key can be consumed, e.g., read, in the order they were written. As an example, a rideshare request from Customer A's mobile device can be written to a segment based on a key corresponding to identification of Customer A's mobile device, such that a series of rideshare requests from Customer A's mobile device can result in a 'stream of events' in the segment all having the same key value, whereby reading the stream based on the key can return the series of rideshare events requested via Customer A's mobile device. As another example, a key can be based on Customer A's username, such that rideshare requests from different devices employing Customer A's username are written/read from an OES in an ordered manner. In an aspect, routing keys can be hashed. Moreover, routing keys can represent a key space. The key space can be divided into a number of partitions. Partitions can be affiliated with an OES segment. As such, consistent hashing can enable reliably assigning events to segments that comprise events with the same key. An OES stream can have a topology that evolves and corresponds to different epochs, e.g., via scaling of an OES. As an example, an OES can initially have a first segment, but where ingestion of events increases above a threshold level, the OES can be scaled to comprise two segments, e.g., a second segment and a third segment. In an aspect, each of the second and third segments can employ a separate processor instance to write events, e.g., scaling the OES can increase the count of processors writing events to the OES. Accordingly, a hashed key space of the first segment can be divided and apportioned to the second and third segments of the scaled OES. As an example, an OES can initially have a first segment covering a key space of 0 to 1, and after scaling, a second segment can cover events from 0 to 0.25 of the key space and a third segment can cover events from 0.25 to 1 of the key space. Additionally, the scaling of the OES can constitute an epoch change, e.g., evolution of the topology of the OES, such that before the scaling the OES had the first segment in Epoch 1 and, after the scaling, the OES can have the second and third segments in Epoch 2. In an aspect, the first segment can be closed at the epoch change and the second and third segments can be opened at the epoch change. In an aspect, the topology change of the OES can result in a change in storage scheme, e.g., in the above example, reading an event with a key space value of 0.75 in the first epoch can read from the first segment and can be distinct from reading another event with a key space value of 0.75 in the second epoch that would read from the third segment. The use of different storage schemes for events of an ordered event stream, e.g., an OES having an evolving topology as an OES advances, can read out OES events according to an appropriate storage scheme for a determined OES epoch.

An OES storage scheme can correspond to a distribution of a hashed key space to segments of an OES. As an example, a first OES storage scheme can have a hashed key space that can extend from 0 to 1, wherein a first segment can store events having a hashed key value 'y' between 0 and 0.28, e.g., $0 \leq y < 0.28$, and a second segment of the OES can store events having 'y' between 0.28 and 1, e.g., $0.28 \leq y < 1$. The example first OES storage scheme can be altered to a next storage scheme, e.g., advanced to a second epoch, wherein the first and second segment can be closed and a third and fourth segment can be opened wherein third segment can store events having a hashed key value 'y' between 0 and 0.7, e.g., $0 \leq y < 0.7$, and the fourth segment of the OES can store events having 'y' between 0.7 and 1, e.g., $0.7 \leq y < 1$. Moreover, the second epoch can end when a third epoch is begun that represents a third OES storage scheme, for example, closing the third and fourth segments and opening fifth through seventh segments, wherein the fifth segment can store events having a hashed key value 'y' between 0 and 0.1, e.g., $0 \leq y < 0.1$, the sixth segment can store can store events having 'y' between 0.1 and 0.5, e.g., e.g., $0.1 \leq y < 0.5$, and the seventh segment can store can store events having 'y' between 0.5 and 1, e.g., $0.5 \leq y < 1$.

Scaling an OES, e.g., instigating an epoch change, can be in response to an OES state change, as an example, determining that computing resource consumption has transitioned a threshold value, or other state change. In an aspect, an event stream can be evenly bifurcated, e.g., each of the two resulting event stream portions can be about one half of the initial event stream in an attempt to divide the amount of computing resources used in the initial stream about evenly between the initial computing resources and newly added additional computing resources. As an example, if an initial event stream causes a load of two units of work for a first processor, the two units of work load are correspond to an even distribution of work across the associated key space of the initial event stream, and the two units of work exceed a threshold work level of the first processor, the stream can be split and a second processor can be added, such that the first processor now supports a second stream, in lieu of the initial stream, at about one unit of work and a third stream can be supported at about one unit of work by a the second processor, again, assuming the work load from the initial stream was distributed roughly evenly across the key space of the initial event stream. In an aspect, asymmetric scaling, for example, scaling into, or from, more than two segments, can be supported by the presently disclosed subject matter.

In an aspect, an event can be added to a head of a stream of events, e.g., a first event can be considered at a tail of the event stream and a most recent event can be regarded as at the head of the stream with other events ordered between the tail and the head of the stream. It is noted that some OES system embodiment(s), e.g., PRAVEGA by DELL EMC, etc., can employ an alternate head/tail terminology, e.g., in PRAVEGA a first event can be added at a head of an OES, while subsequent new events can then be added to a tail of the OES, however, this is indistinguishable in all other aspects from the head/tail convention employed in the instant disclosure.

In an aspect, a segment of an event stream can generally be associated with a single processing instance to assure ordering of the events stored in the segment. A processing instance can be a single real physical processor, a virtualized processor executing on one or more real physical processors, a group of real physical processors, a group of virtual processors executing on one or more real physical processors, etc. As an example, a processing instance can be a blade server of a rack system. As another example, a processing instance can be a virtual processor deployed in an elastic computing system, e.g., a 'cloud server,' etc. Typically, a processing instance can be associated with a level of processor performance which, in some embodiments, can be measured via one or more key performance indicators (KPIs) for the processing instance. As an example, a first blade server of a rack can have a first level of performance and a second blade server of a rack can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support costs, real estate for deployment costs, etc. As such, selecting an appropriate processing instance can be associated with optimizing cost. As an example, if an event stream always consumes less than one unit of work, then pairing the stream with a processing instance that can perform one unit of work can be a better use of computing resources, e.g., lower overall aggregate costs, etc., than pairing the even stream with a processing instance that can perform 200 units of work which can result in wasting up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance instance.

In an aspect, transitions between OES epochs, e.g., changing OES storage schemes can be related to changing write and read demands associated with a stream of data. As an example, writing ride share service events to an OES can be according to OES segments that can divide the hashed key space into regions, e.g., a west region, a central region, and an east region. In this example, as peak demand for ride share services can be associated with the time zones, for example being busier in the east zone at local 5 pm than in the west zone that is at local 2 pm. A such, there can be more demand, in this example, to write data to the OES segment corresponding to the east region and the storage scheme can meet this demand by scaling the OES segment to allow more east region data to be written, e.g., splitting the example OES segment to more segments to allow engaging more processors, which, in some embodiments, can increase the hashed key space related to the now plural OES segments for east region event writing. Moreover, as time continues, demand can increase in the west region and wane in the east region, for example 5 pm in the west can be 8 pm in the east. As such, the east region segments can be scaled down and the west region segments can be scaled up, e.g., effectively shifting processing power to storage of west region events rather than east region events. The change in scaling of the segments of the OES can be associated with a change in storage scheme that can be referred to as a change in OES storage epochs, for example see system 200, etc. The details on epoch changes are generally outside the scope if the instant disclosure but changes in OES storage schemes can be relevant to the instant disclosure in that these epoch changes can complicate determining if a conditional append is permitted, e.g., access to attributes of a first segment from a first epoch can be needed for analysis of a conditional append in a second segment of a second epoch, as is disclosed in more detail herein below.

In an aspect, a segment can be scaled where a threshold performance occurs. As an example, an event stream segment can typically consume less than one unit of work, e.g., one unit of computing resources, and the stream segment can be associated with a processing instance that can perform up to one unit of work. However, in this example, where the segment increases demand to 1.5 units of work, the segment can be scaled, e.g., split into two daughter segments, such that each daughter segment can be associated with events for half of the key space of the parent segment before scaling. In this example, where the daughter segments are each associated with a processing instance that can perform one unit of work, and where the key space of the initial segment has a generally even distribution of work, then each daughter segment, for example, can be associate with about 0.75 units of work, e.g., the parent segment now consumes at 1.5 units, e.g., exceeding the capacity of the existing processing instance, and the parent segment can be split into two daughter segments at about 0.75 units each where each daughter segment can now consume less than the one unit of work available through their corresponding processing instances.

In an aspect, an OES storage system can be instructed to retain a designated number, amount, etc., of most recent events/data. As such, older or stale events/data can be deleted. However, where an older event can still be relevant, deletion can be undesirable. In this or other situations, it can be desirable to move the event data to another type of storage. This can lead to a multi-tier OES storage system, for example having tier-1 storage for most recent events, tier-2 storage for older events that remain desirable to retain. Moreover, older events that are stale can then be deleted in some embodiments. In other embodiments, older events can be moved to permanent off-line archive storage, or other archival technologies. In an embodiment, tier-1 storage can be storage that facilitates fast access to events/data in comparison to tier-2 storage. As an example, tier-1 storage can be a storage of a single data center providing fast access to stored events via a local network or bus, while a corresponding tier-2 storage can store data in multiple geographically distinct locations connected via a communications framework, such as a wide area network, that can result in event/data access being slower than via the tier-1 storage, e.g., tier-2 can have more latency, reduced bandwidth, greater error correction needs, or other impediments, that can lead to slower access to events stored via the example tier-2 system. In one example embodiment, a first tier embodied in PRAVEGA can be coupled with a second tier embodied in ECS by DELL EMC. In this example embodiment, tier-1 events can be readily accessed in PRAVEGA while tier-2 events can be aggregated into chunks written into ECS for storage. As such, in this example, access to events via ECS chunks can typically be slower than access to events via PRAVEGA. In an aspect, a chunk, e.g., an ECS chunk, or other block of data, can be an ordered series of events. In this case, PRAVEGA can work as a Tier-1 of a multi-tiered system and the ECS storage system can work as a Tier-2. Autotiering can enable transitioning tier-1 events to other tiers, e.g., moving events from tier-1 'hot' access to other tiers that can have 'cooler' access. Where an OES employs multi-tier topology, it can be efficient to store a great deal of OES data via tier-2 to allow tier-1 data to be stored in a nimble and efficient manner, e.g., where tier-2 can be less costly, widely available, highly resilient storage, and where tier-1 can be more costly, less widely available, etc., offloading all but hot data can be desirable in an implementation. However, this can also complicate conditional appends. In an aspect, the disclosed subject matter can enable access to attributes between storage tiers. In an example, chunks that can store events, for example as tier-2 storage, can comprise an indication of event keys for events stored via the chunk, for example a chunk can comprise a header storing a key and an index value corresponding to an event stored via a body of the chunk. This example can enable identifying that the chunk stores an event corresponding to the key and can further enable access to the portion of the chunk body that stores the event, e.g., based on the index value, which can enable accessing an attribute related to determining advancement of a conditional append, which can be beneficial to a multi-tier OES storage system.

In an aspect, conditional appends to an OES, as disclosed herein, can attempt to add an event to an OES only where a condition is determined to be satisfied, e.g., a condition, rule, etc. As such, an append operation that is determined to fail to satisfy a condition/rule/etc., can be prevented from writing an event to the OES. In an aspect, an advantage of the disclosed technology can be that special user code is typically not required because conditional appends can be managed internal to the OES storage system at an atomic level while still providing consistency and durability guarantees already associated with a previously existing modern stream storage system, such as PRAVEGA, etc.

In an aspect, a storage system generally must manage concurrent access and ensure data consistency in spite of concurrent updates from different sources. As an example in general computing, 'locks' can be a popular solution, however locks can typically be overly coarse-grained and can be greedy in regards to computational resources and management efforts. In an aspect, an "optimistic concurrency control" mechanism can be employed in the presently disclosed subject matter, which can comprise, for example, 'conditional updates.' In general, a conditional update can be in the form "apply update X if and only if (iff) condition Y is true," e.g., a storage system can atomically validate Y before applying X and rejecting X if validating Y fails. Typically, in order to implement such updates, a storage system can maintain and expose metadata corresponding to formulation of validation conditions. As an example, in regards to an append-only storage medium, e.g., an OES, such metadata can be reduced to only the length of the OES. In this example, the above condition can be then re-written as, "append X if OES length equals L" which can be reduced, in practice, to, "append X [and update OES length to L+X.length] iff OES length equals L" because appending X can be understood to increase the length of the OES. A benefit of the example length conditional append can be that a first user can know a "state of the example OES" and the OES storage system can then presume that no other entity/user/actor has modified that state without the first user knowing about. This presumption can enable a user to act where a conditional append is rejected, for example, the first user can refresh the OES length state, raise an error, or other act, based on the OES length not being what the first user expected it to be. As an example, where a first user writes 162 events to a stream, the first user can expect that the next write can be at position 163, however where first user conditions the 163rd write with length=163, and the OES length is at 165, then the condition fails and the first user can know that some other actor has altered the length of the OES and can take a subsequent action in response. However, an OES length can be difficult to determine where an OES can be scaled, where segments can be stored in different locations, where data can be stored in different types of storage, or where other aspects of modern OES storage systems become increasingly complex. As an example, an OES segment can store data from different writers for a portion of a key space corresponding to the OES segment. In this example, let a segment store events for keys between 0 and 0.5, then a first writer sending an event with a key of 0.2 extends a length of the segment to L1, and a second writer sending an event with a key of 0.4 can extend the length of the segment to L2. However, the first writer can be unaware that the second writer extended the length, which can result in the first writer conditioning a next write with a key of 0.2 based on L1. This condition can fail because the segment is at L2 after the second writer action. While it is possible to relegate every writer to a separate segment, e.g., each key has a separate segment, this can defeat the purpose of allowing multiple writers to write events into a segment associated with a range of keys, which can allow a processor of the segment to accommodate writes from one or more writers, rather than having a processor allocated to every single writer. Moreover, where the segment is scalable, it can become difficult to define what the length of the segment actually is, for example, a routing key of 0.6 in FIG. 2 can have multiple length interpretations because the topology of the OES has undergone multiple epoch transitions. Similarly, distribution of storage/processing to remote locations, different types/tiers of storage, etc., also can be appreciated as complicating a definition of length as a criterion. In view of the issues listed for the example, length-conditional appends can generally be regarded as substantially less than ideal for conditional appends in a modern OES storage system. The disclosed subject matter illustrates conditional append technology that can be employed in a modern OES storage system.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate conditional appends of an event to a segment of an ordered event stream, in accordance with aspects of the subject disclosure. System 100 can comprise a storage component 102 that can store an ordered event stream (OES) 110, 111, etc. OES 110, 111, etc., can store one or more events. An event can be associated with a key, e.g., a routing key. A key can typically be determined from information corresponding to an event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110, 111, etc., in an ordered manner. Similarly, events with a same key can be read from OES 110, 111, etc., generally in an ordered manner, e.g., in the order they were previously written into OES 110, 111, etc. Components providing events to be written to an OES can be termed 'writers' and components requesting events from an OES can be termed 'readers'. As such, a writer can provide an event that can be written to OES 110, 111, etc., in an ordered manner based on a key associated with the event. Similarly, a reader can receive an event from OES 110, 111, etc., based on a key and according to an order in which the event was written.

Processor component 104 of a system 100 can receive write(s) 106 that can be written to OES 110, 111, etc., to be stored via storage component 102. Processor component 104 of a system 100 can provide access to events based on a key, e.g., as read(s) 107 that can be communicated to a reader. Generally, one processing instance, e.g., processor component 104, or other processing instance, is designated for writing events to a portion, e.g., a segment, of OES 110, 111, etc. OES 110, 111, etc., can comprise one segment and/or parallel segments, e.g., stream segments, see FIG. 2, etc., that can store events according to a key. In an aspect, more than one processing instance can write to a segment of an OES, however, in some embodiments, this can increase the difficulty of writing incoming events in an ordered manner. A given processing instance can read/write to more than one OES segment, e.g., a given processing instance can write to one or more OESs, to one or more segments of one OES, to one or more segments of one or more OESs, etc. Generally, for a given number of segments there can typically be up to the same number of processing instances. Although adding more processing instances is allowable, these additional processing instances can be left idle to avoid possible scrambling of an order of events being written to a segment. It is further noted that system 100 can comprise idle processing instances, for example, as reserve processing instances for failover where an active processing instance becomes less responsive, etc., for rapid OES scaling, or for other reasons. In an aspect, keys of one or more segments of an OES can represent a key space for OES 110, 111, etc., see FIG. 2, etc. Segments can therefore act as logical containers associated with a particular range of keys for an event stream and can be used to store events within an OES. When a new event is written to a stream, it can be stored to one of the segments based on the event key. In an aspect, the key space can be divided into a number of ranges that can correspond to a number of segments comprising an OES. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the first segment after the second event, etc.

OES 110, as illustrated in system 100, can be a simplistic example of an OES that can comprise just one segment for storing incoming event write(s) 106 and sourcing event read(s) 107, and therefore the key space of OES 110 can be embodied in the example single segment of events, e.g., the key space of OES 110 is not illustrated as being distributed across more than one parallel event storage segment. Example OES 110 can have an origin terminus 112. A first event can be written at origin terminus 112. The subsequent events can then be appended at an additive terminus 114 that is typically always at the head of the stream of written ordered events, e.g., a most recent event is written to the head of example OES 110, which can provide ordering of the events being written. This can result in example OES 110 allowing for continuous and unbounded data storage that can be a durable, elastic, append-only, unbounded sequence of events. As an example, a $(K+1)^{th}$ event can be appended to the $K^{th}$ event of example OES 110 at additive terminus 114. In an aspect, storage component 102 can store any number of OESs, e.g., OES 110, 111, etc. Moreover, any one OES can comprise any number of parallel segments, e.g., stings of events for a defined key space range. Each segment can comprise an ordered sequence of stored events. In an aspect, an OES e.g., OES 110, 111, etc., can comprise segments stored at disparate physical locations, e.g., distributed storage, distributed processor(s), etc.

In an aspect, an OES, e.g., OES 110, 111, etc., can be scaled, for example, 'scaling up,' e.g., increasing a count of parallel segments of OES 110, 'scaling down,' e.g., decreasing a count of parallel segments of OES 110, etc. Moreover, OESs, or portions thereof, can be merged. In an aspect this can enable reading out events of merged segments in a manner that appropriately interleaves/merges the ordering of the written OES events. As an example, OES 110 and OES 111 can be merged such that reading out the resulting merge can comprise reading out the events of each of OES 110 and 111 in an ordered sequence related to the order in which the events were written to each of OES 110 and 111.

In system 100, stream control component (SCC) 120 can facilitate adapting OES topology(ies), e.g., scaling up, merging, compacting, or other adaptations to OES topology. As an example, an OES can comprise events ordered according to a progress metric, for example where progress is temporal, a most recent event, an older event and an oldest event. Where the example OES is designated as retaining fewer events than this, some events can be removed from the OES. This can occur, for example, to conserve storage space, based on a cost threshold, or due to other constraints. Accordingly, for example, compaction can release the oldest event to make room for storing an incoming most recent event. Alternatively, in example, additional storage space can be added to accommodate the growing stream segment, the segment can be scaled up to enable writing to two stream segments rather than just one, events can be transitioned to other tiers of storage, or other topologic adaptations of the example OES can be facilitated via SCC 120.

System 100, can further comprise conditional append component (CAC) 130 that can facilitate performing a conditional append to an OES or segment thereof. As is stated elsewhere herein, a conditional append can facilitate determining that a condition/rule is satisfied in relation to permitting an event to be appended, e.g., written, to an OES or segment thereof. In an aspect, a conditional append can be based on contextual user-supplied metadata, generally that a user can define and modify at will. While previous discussion of the downfalls of a OES length-based condition have been presented, an example of contextual user-supplied metadata can be an 'assumed OES length,' e.g., what the user believes the OES length to be. For the aforementioned reasons, OES length is typically not considered useful contextual user-supplied metadata for conditional append purposes. In an aspect, CAC 130 can be communicatively coupled to SCC 120 to enable exchanging OES/segment topology information. In a further aspect, CAC 130 can be communicatively coupled to processor 104 to enable interacting with an OES/segment stored on storage component 102, e.g., via read(s) 107 and write(s) 106, where write(s) 106 can be understood to be conditionally permitted based on interaction with CAC 130.

In an aspect, contextual user-supplied metadata can be viewed as attributes of an OES/segment and can be termed stream attribute(s) hereinafter. A stream attribute can be a key-value pair. In an embodiment a keys and a value(s) can be of fixed size, as a non-limiting example, all keys can be 16-bytes and all values can be 8-bytes. Events appended to a segment can correspond to one or more attributes, hereinafter attribute update(s) and/or AU(s), that can be employed to update stream attributes of the OES comprising the segment, in addition to the event corresponding to a routing key value, as has been previously discussed. To facilitate backward compatibility to existing modern stream storage systems like PRAVEGA, etc., where the AU(s) are 'empty,' e.g., no AU value(s) is provided with an event, then the conditional append can be regarded as an 'unconditional append' and can be appended to an OES segment without further validation of any condition, e.g., by not providing AU(s), stripping AU(s) from events, etc., an event can be written to an OES without validating any condition and the OES storage system can operate as it did before.

In an aspect, where an event to be written corresponds to AU(s), the event can be considered a 'composite append,' rather than the above noted unconditional append. A composite append can be further classified as being of a conditional-type or of an unconditional-type. In an aspect, where the composite append comprises AU(s) that do not correspond to a conditional permission to write the event to the segment of the OES, then the event can be regarded as a 'composite unconditional append' that can function the same as, or similar to, the previously noted unconditional append. As such, for a composite unconditional append, the event can be written regardless of validating a condition. However, in some embodiments, the AU(s) of a composite unconditional append can still be used to update stream attributes even where writing the event is not predicated on validating a condition. In an aspect, where the AU(s) of a composite append do correspond to a conditional permission to write an event to the segment of the OES, then the composite append can be regarded as a 'composite conditional append' that can be written to the OES in response to the condition being determined to be satisfied, e.g., the condition is validated. Similar to the composite unconditional append, the AU(s) of the composite conditional append can be used to update the stream attributes. In an aspect, a composite append can append an event payload, where no condition is indicated or where a condition is determined to be satisfied, and can apply the supplied AU(s) to an appropriate segment of an OES. The conditional append enables atomically verifying a condition is satisfied before writing the event to a segment or rejecting the append if the condition is determined to not be satisfied and not permitting the vent to be written to the segment.

Figure 2:
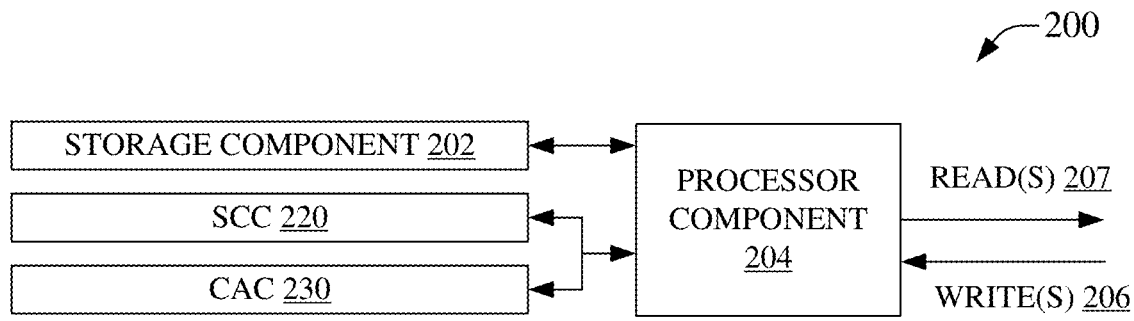
FIG. 2 is an illustration of an example system enabling a conditional append of an event to a segment of a scalable ordered event stream that can comprise distributed segments, in accordance with aspects of the subject disclosure.
Figure 2:
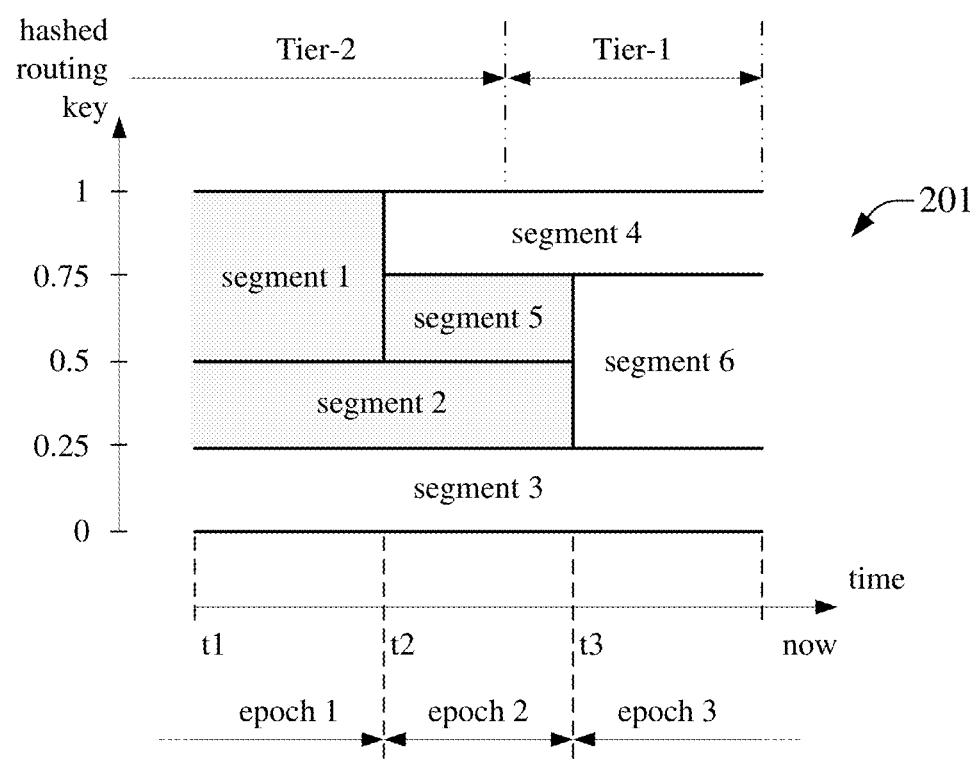

FIG. 2 is an illustration of an example system 200 enabling conditional appends of an event to a segment of a scalable ordered event stream that can comprise distributed segments, in accordance with aspects of the subject disclosure. Ordered event stream data storage system 200 can comprise processor component 204 that can receive write(s) 206 and enable read(s) 207 for events stored via storage component 202. SCC 220 can enable adapting a topology of an OES stored via storage component 202. In an embodiment, storage component 202 can comprise one or more storage devices in one or more physically distinct locations, e.g., as distributed storage, wherein the storage can be of one or more types of event storage, e.g., a tier-1 store, a tier-2 store, etc. In an aspect, CAC 230 can facilitate performing a conditional append to a segment of an OES, e.g., facilitating a determination of an unconditional append, a composite unconditional append, or a composite conditional append, and corresponding subsequent updating of stream attribute(s) and/or permissive appending of an event to a segment.

Typically, OES events can be stored in order of a stream progress metric, for example, time, event count, or some other progress metric, e.g., at a number of revolutions, at a time of day, per occurrence of a transaction, a count of widgets passing a sensor, etc. Generally, for the sake of simplicity, progress can be regarded as temporal and is hereinafter typically discussed in terms of progressing time for simplicity and clarity, although it is expressly noted that other progress types are within the scope of the instant disclosure and can be readily employed in almost every aspect of the instant disclosure as recited herein. At a first progress point, for example t1, OES storage system 200 can store OES 201, which can comprise one or more parallel segments, e.g., segment 1, segment 2, segment 3, etc. At some point a segment can be scaled. As an example, at t2, segment 1 can be scaled up. This can result in generating segment 4 and segment 5 and correspondingly sealing segment 1. The topology of the OES comprising segments 1, 2, and 3 before scaling can be designated as epoch 1. Similarly, the topology of the OES comprising segments 2, 3, 4, and 5 after scaling can be designated as epoch 2. These actions can be facilitated by SCC 220.

In an aspect, segments 2 and 3 can be contiguous across epochs 1 and 2, while segment 1 can end at the transition from epoch 1 to 2. In an aspect, in epoch 1, events associated with a key between 0.5 and 1, e.g., $0.5 \leq key < 1$, can be written (and read from) segment 1, while in epoch 2, events associated with a key between 0.75 and 1, e.g., $0.75 \leq key < 1.0$, can be written (and read from) segment 4 and events associated with a key between 0.5 and 0.75, e.g., $0.5 \leq key < 0.75$, can be written (and read from) segment 5. As such, access to events for a given key can be associated with reads in different epochs. As an example, reading an event with a key of 0.8 can read from both segment 1 and segment 4. Where a read is performed from head to tail, the read of example events with a key of 0.8 can begin reading in segment 4 and then continue reading into segment 1 across the epoch boundary between epoch 2 and 1, albeit with different corresponding storage schemes used to facilitate the reading operation(s). Similarly, where the read can be from tail to head, events associated with the example key of 0.8 can begin in segment 1 and continue into segment 4 across the epoch boundary. However, it is noted that generally no additional events are written into segment 1 after a new epoch is begun, e.g., in epoch 2, the topology of OES 201 can comprise segments 2, 3, 4, and 5. At some point further scaling can be undertaken, e.g., at t3, OES 201, for example, can scale down by ending segments 2 and 5 and starting segment 6 beginning at t3. This example scaling down can reduce a count of segments comprising OES 201. The scaling at t3 can result in ending epoch 2 and beginning epoch 3. As such, in epoch 3, the topology of the OES comprising segments 3, 4, and 6, post-scaling, can distribute the key space of OES 201, for example, as $0 \leq segment\ 3 < 0.25$, $0.25 \leq segment\ 6 < 0.75$, and $0.75 \leq segment\ 4 < 1.0$.

In an aspect, hierarchical event storage can be related to efficiency of event storage. In an example, it can be determined to be inefficient to store data in a first tier where that event has transitioned a designated event access frequency value. As such, in this example, where an event transitions the event access frequency value, it can be aggregated into a chunk of tier-2 type storage, where, for example, tier-1 type storage can store events above an access frequency threshold and tier-2 type storage can store events that transition the access frequency threshold. As such, tier-1 can store, for example, events of segments 6, as well as some events of segments 2, 3, 4, and 5, while tier-2 can store events of segment 1, as well as other events of segments 2, 3, 4, and 5. Accordingly, event storage via a chunk can include storage of events in one or more segment, in one or more epoch, and in one or more storage-type tiers. In an aspect, as new segments occur in a stream as a result of scaling and other segments are correspondingly sealed, where events can be stored via different types of storage, or where there can be distributed data storage, a mechanism to provide a meaningful use of an AU in determining satisfaction of a condition in regard to a stream attribute can be desirable. OES 201 can illustrate some of the complexities solved by the presently disclosed conditional append technology as is described in more detail herein below. However, it can be appreciated that CAC 230 can facilitate writing an event that has an AU indicating a condition, e.g., the event is a composite conditional append, where the condition is determined to be satisfied. In contrast to conventional techniques, CAC 230 can facilitate these aspects across a local or distributed storage scheme, for scalable segments of an OES storage system employing one or more types of storage. Exploring CAC 230, and similar components, e.g., CAC 330, etc., can begin in relation to an event to be appended to a single segment of an OES for simplicity, clarity, and brevity.

Figure 3:
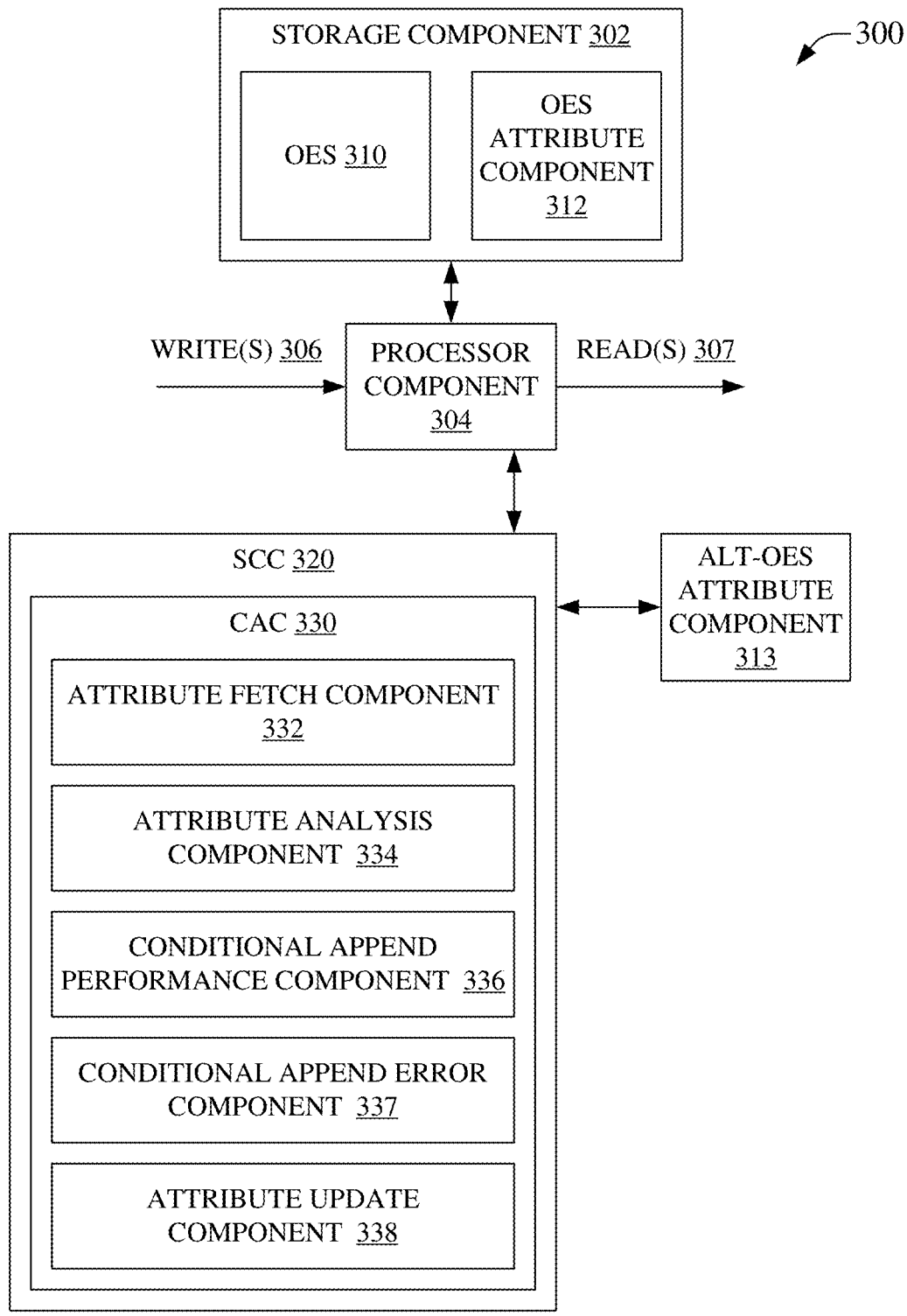
FIG. 3 illustrates an example system that can facilitate a conditional append of an event to a segment of an ordered event stream based on a corresponding OES attribute, in accordance with aspects of the subject disclosure.

FIG. 3 is an illustration of a system 300, which can facilitate conditional appends of an event to a segment of an ordered event stream based on a corresponding OES attribute, in accordance with aspects of the subject disclosure. Ordered event stream data storage system 300 can comprise processor component 304 that can receive write(s) 306 and enable read(s) 307 for events stored via storage component 302. SCC 320 can enable adapting a topology of an OES stored via storage component 302. In an embodiment, storage component 302 can comprise one or more storage devices in one or more physically distinct locations, e.g., as distributed storage, wherein the storage can be of one or more types of event storage, e.g., a tier-1 store, a tier-2 store, etc. In an aspect, CAC 330 can facilitate performing a conditional append to a segment of an OES, e.g., facilitating a determination of an unconditional append, a composite unconditional append, or a composite conditional append, and corresponding subsequent updating of stream attribute(s) and/or permissive appending of an event to a segment.

In an aspect, a stream segment can be regarded as non-distributed, e.g., a segment, in some embodiments, can be a contiguous range of bytes in a single storage device. These bytes can be addressed by an offset from a first byte, e.g., the segment can be regarded as having a length. In other embodiments, a segment can span storage devices, comprise different types of storage, etc., but these aspect can be initially ignored in an initial discussion of the disclosed subject matter, e.g., to facilitate clarity and brevity of this disclosure. Events having keys within the bounds of the key space supported by the segment can be added to the segment, e.g., written to the segment of the OES, appended to the segment of the OES, etc. Stream attributes can be correlated to a segment. In an aspect, stream attributes corresponding to a segment can be termed segment attributes. Segment attributes can be implemented by nearly any data structure, for example a B+Tree, in another stream, as separate events having a key in the range of the segment, or via nearly any other data structures. Stream attribute(s), segment attribute(s), etc., can be stored via OES attribute component 312, via alt-OES attribute component 313, or other components of OES system 300. Generally, the segment attribute(s) can be protected, hidden, etc., for example, to limit modification of the segment attributes to an ingestion pipeline component, for example, as is disclosed in U.S. Pat. No. 10,594,759, or by other intentionally permitted OES storage system components.

In an aspect, an example ingestion pipeline for OES storage system 300, can process appends and atomically validate them against a current state of a segment. The example ingestion pipeline can fetch requested attribute value(s) from stored segment attribute(s), e.g., via attribute fetch component 332, compare requested attribute value(s) against a determined condition for a conditional append, e.g., via attribute analysis component 334, append the event to the segment, e.g., via conditional append performance component 336 and processor component 304, and update segment attribute(s) based on AU(s) corresponding to the event, e.g., via attribute update component 328. As such, an append 'A' comprising an event 'E' and corresponding attribute updates 'AUs' can be received by OES storage system 300 such that CAC 330 can, via attribute fetch component 332, access segment attributes of stream attributes corresponding to the AUs. In an aspect, CAC 330 can be comprised in SCC 320, although in other embodiments, CAC 330 can be external to SCC 320, for example CAC 230 can be separate from SCC 220, etc.

In an aspect, attributes $A_1 \ldots A_n$ of the AUs, and the corresponding values $V_1 \ldots V_n$ can be retrieved via attribute fetch component 332 to enable attribute analysis component 334 to validate each condition indicated in the AUs, for example, where a condition '$C_i$' is indicated, $C_i$ and $V_i$ can be analyzed to determine if the condition is satisfied in relation to $A_i$. Where it is determined that the condition is not satisfied, appending the event to the segment is not permitted and can be aborted. In an aspect, an absence of an attribute can also be regarded as a condition, for example, an update is permitted if and only if an attribute, e.g., $A_1 \ldots A_n$, does not exist among the AUs. It is further noted that all conditions of the append must be determined to be satisfied for the event to be permitted, e.g., where there are multiple conditions, any one failure can result in the event not being permitted to be appended to the stream. Accordingly, conditional append performance component 336 can facilitate appending, e.g., via write(s) 306, the event to the segment. In an aspect, errors can be returned where appending the event to the stream is deemed unpermitted and terminated due to a condition failure. An error(s) can be returned via conditional append error component 337. Moreover, updates to stream/segment attributes, e.g., stored via OES attribute component 312, alt-OES attribute component 313, etc., can be updated based on AU(s) for the event via attribute update component 338. In an aspect, the event and updated stream/segment attribute(s) can be made visible to other components, for example, based on the technology disclosed in U.S. Pat. No. 10,594,759 in conjunction with the technology disclosed in U.S. Pat. No. 10,666,703. Moreover, use of a caching layer can enable quick updates of segment attributes and quick access thereto, and which can be periodically employed to update OES attribute component 312, alt-OES attribute component 313, etc., for more durable storage of attributes, e.g., streams/segments that are experiencing high event ingestion rates can perform many attribute updates that can be cached to allow faster access to the updated attributes while less active streams/segments can be accommodated by OES attribute component 312, alt-OES attribute component 313, etc., with perhaps less benefit from a cache.

Where attributes are readable, it is noted that an absence of an attribute can be treated as a null value for said absent attribute.

Figure 4:
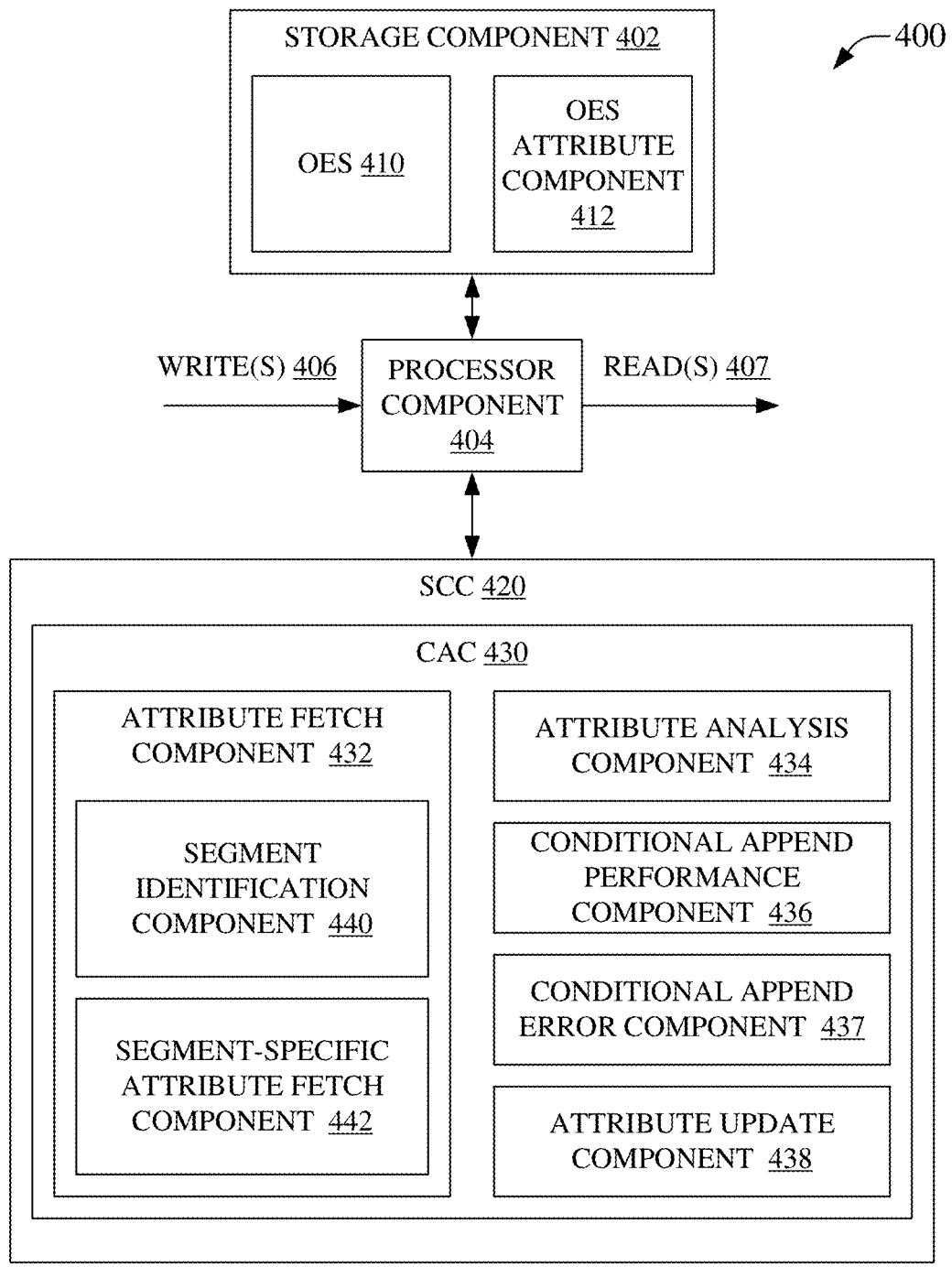
FIG. 4 is an illustration of an example system facilitating conditionally appending an event to a segment of an ordered event stream based on a corresponding segment-specific attribute, in accordance with aspects of the subject disclosure.

FIG. 4 is an illustration of an example system 400, which can enable conditional appends of an event to a segment of an ordered event stream based on a corresponding segment-specific attribute, in accordance with aspects of the subject disclosure. Ordered event stream data storage system 400 can comprise processor component 404 that can receive write(s) 406 and enable read(s) 407 for events stored via storage component 402. SCC 420 can enable adapting a topology of an OES stored via storage component 402. In an embodiment, storage component 402 can comprise one or more storage devices in one or more physically distinct locations, e.g., as distributed storage, wherein the storage can be of one or more types of event storage, e.g., a tier-1 store, a tier-2 store, etc. In an aspect, CAC 430 can facilitate performing a conditional append to a segment of an OES, e.g., facilitating a determination of an unconditional append, a composite unconditional append, or a composite conditional append, and corresponding subsequent updating of stream attribute(s) and/or permissive appending of an event to a segment.

Whereas an OES, can comprise segments stored in a physically distributed manner, across different types of storage, and/or according to different epochs due to scaling or other topological changes, as has been disclosed elsewhere herein, conditional appends based on a routing key can refer to a segment that can be more challenging to assess due to the more complicated nature of the OES. However, we can treat an OES, that itself can be regarded as distributed, as comprising segments that can individually be regarded as non-distributed. Moreover, where a topology changes and an event key can then refer to segments in different locations in different epochs, techniques disclosed herein can be applied to maintain continuity of stream attributes at a segment level between epochs, such that conditional appends can be facilitated. As has been noted, stream attribute(s), segment attribute(s), etc., can be stored via OES attribute component 412, or other components, for example, via alt-OES attribute component 313, etc.

In an aspect, an example ingestion pipeline for OES storage system 400, can process appends and atomically validate them against a current state of a segment. The example ingestion pipeline can fetch requested attribute value(s) for a specific segment based on a routing key from stored segment attribute(s), e.g., via attribute fetch component 432, compare requested attribute value(s) against a determined condition for a conditional append, e.g., via attribute analysis component 434, append the event to the segment, e.g., via conditional append performance component 436 and processor component 404, and update segment attribute(s) based on AU(s) corresponding to the event, e.g., via attribute update component 428.

In an aspect, a composite append 'A' comprising an event 'E' with a routing key 'RK' and attribute updates 'AU' can be received by OES storage system 400 to be appended. Accordingly, CAC 430 can, via attribute fetch component 432, access segment attributes of stream attributes corresponding to the AUs for a specific segment. In an aspect, CAC 430 can be comprised in SCC 420, although in other embodiments, CAC 430 can be external to SCC 420, for example CAC 230 can be separate from SCC 220, etc. In an aspect, Attribute fetch component 432 can comprise segment identification component 440 that can interact with SCC 420 to identify a segment of an OES corresponding to storage of an event having routing key RK, e.g., SCC 420 can be aware of the topology of an OES, namely what key range each segment of an OES corresponds to. Generally, SCC 420 can also facilitate access to key ranges for segments of the OES in other epochs. Segment attribute(s) for the identified segment can then be accessed via segment-specific attribute fetch component 442, e.g., for each AU attribute a corresponding segment attribute can be fetched for the identified segment, for example via OES attribute component 412. The key RK can be merged with the fetched segment attribute(s) such that the attributes are specifically related to the key RK and thus the identified segment, as an example, RK can be prepended via bitwise concatenation to each segment attribute via $A_i:=\{RK, A_i\}$ for each $A_i$ fetched by segment-specific attribute fetch component 442.

In an aspect, segment attributes $A_1 \ldots A_n$, after being updated to reflect the key RK, and their corresponding values $V_1 \ldots V_n$ can be employed to enable attribute analysis component 434 to validate each condition indicated in the AUs, for example, where a condition '$C_i$' is indicated in the AUs, $C_i$ and $V_i$ can be analyzed to determine if the condition is satisfied in relation to segment attribute $A_i$, where $A_i:=\{RK, A_i\}$. Where it is determined that the condition is not satisfied, appending the event to the segment is not permitted and can be aborted. As before, an absence of an attribute can also be regarded as a condition, for example, an update can be permitted if and only if a stream attribute, e.g., $A_1 \ldots A_n$, does not exist, wherein the stream attribute corresponds to a group of attribute updates. It is again further noted that all conditions of the append must be determined to be satisfied for the event to be permitted. Accordingly, conditional append performance component 436 can facilitate appending the event to the segment, e.g., via write(s) 406. In an aspect, errors can be returned where appending the event to the stream is deemed unpermitted and terminated due to a condition failure. An error(s) can be returned via conditional append error component 437.

In an aspect, where a segment attribute, corresponding to an attribute of AU, cannot be fetched by segment-specific attribute fetch component 442 because it is missing, e.g., OES attribute component 412 cannot return the segment attribute because it does not (yet) exist, a missing value resolution operation can be undertaken as is disclosed herein below and the append can be subsequently reattempted, e.g., if the missing value resolution operation can return the missing segment attribute, the subsequent reattempt to append can have a different result. In an aspect, the missing value restoration operation can be avoided in embodiments wherein the missing segment attribute is used as a negative condition, see herein above, e.g., a missing value resolution operation can be avoided where an absence of an attribute is to be regarded a condition, a missing value resolution operation can be performed where an absence of an attribute is not regarded a condition, etc. This missing segment attribute can be distinct from the append being rejected for a condition not being satisfied due to a mismatch between $C_i$ and $V_i$, which can result in not all conditions being satisfied and the option to return an error via conditional append error component 437. Furthermore, in some states, the missing value can result from a segment being sealed during a concurrent scaling event, which can be resolved upon the segment being assigned to an earlier epoch, e.g., the missing segment attribute can be accessed via the missing value resolution operation and the conditional append can be retried. Subsequently, updates to stream/segment attributes, e.g., stored via OES attribute component 412, etc., can be updated based on AU(s) for the event via attribute update component 438. In an aspect, the event and updated stream/segment attribute(s) can be made visible to other components.

Figure 5:
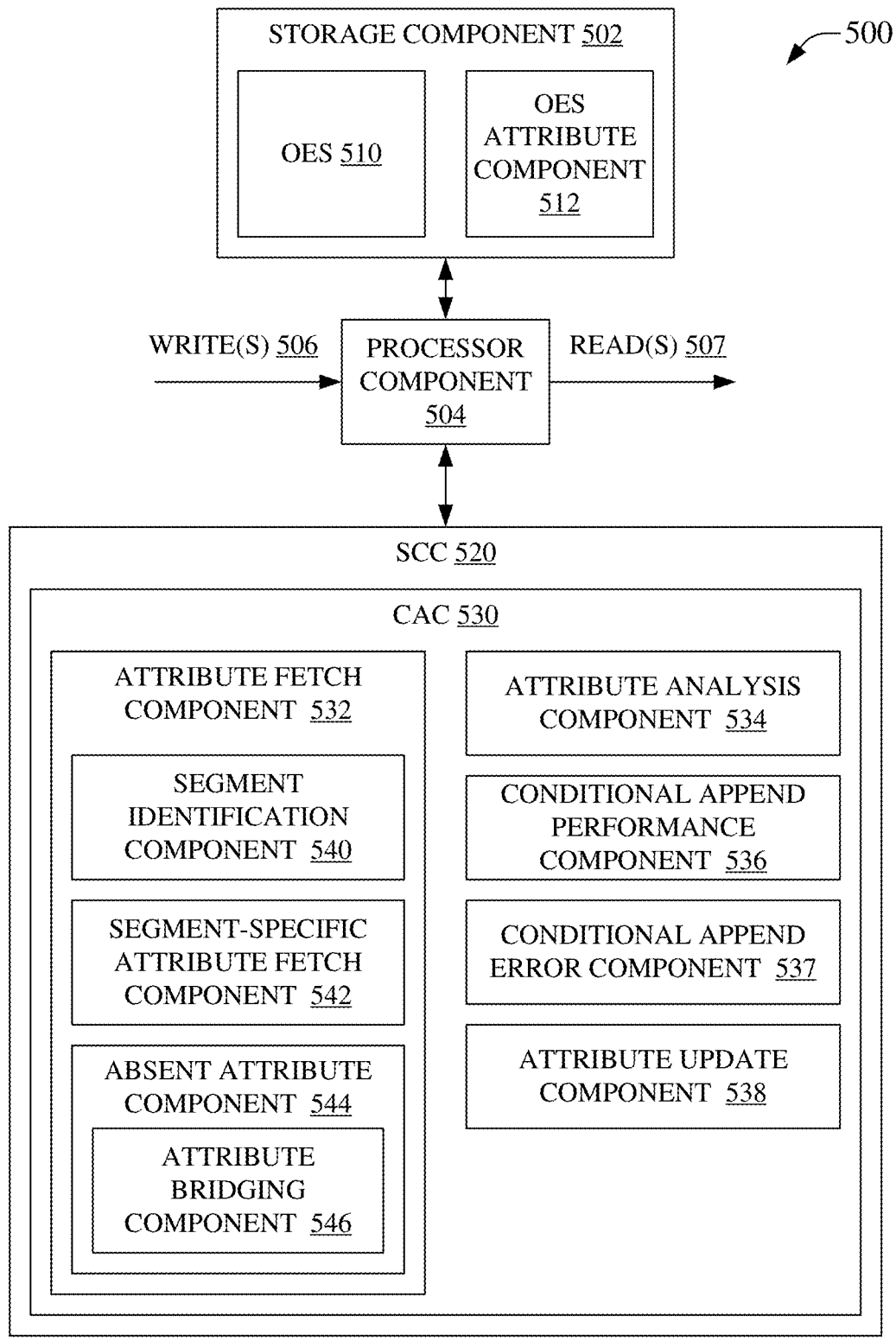
FIG. 5 is an illustration of an example system that can enable a conditional append of an event to a segment of an ordered event stream based on a corresponding OES attribute determined via an attribute bridging operation, in accordance with aspects of the subject disclosure.

FIG. 5 is an illustration of a system 500 that can facilitate conditional appends of an event to a segment of an ordered event stream based on a corresponding OES attribute determined via an attribute bridging operation, in accordance with aspects of the subject disclosure. Ordered event stream data storage system 500 can comprise processor component 504 that can receive write(s) 506 and enable read(s) 507 for events stored via storage component 502. SCC 520 can enable adapting a topology of an OES stored via storage component 502. In an embodiment, storage component 502 can comprise one or more storage devices in one or more physically distinct locations, e.g., as distributed storage, wherein the storage can be of one or more types of event storage, e.g., a tier-1 store, a tier-2 store, etc. In an aspect, CAC 530 can facilitate performing a conditional append to a segment of an OES, e.g., facilitating a determination of an unconditional append, a composite unconditional append, or a composite conditional append, and corresponding subsequent updating of stream attribute(s) and/or permissive appending of an event to a segment.

In an aspect, an example ingestion pipeline for OES storage system 500, can process appends and atomically validate them against a current state of a segment. The example ingestion pipeline can fetch requested attribute value(s) for a specific segment based on a routing key from stored segment attribute(s), e.g., via attribute fetch component 532, compare requested attribute value(s) against a determined condition for a conditional append, e.g., via attribute analysis component 534, append the event to the segment, e.g., via conditional append performance component 536 and processor component 504, and update segment attribute(s) based on AU(s) corresponding to the event, e.g., via attribute update component 528.

In an aspect, a composite append 'A' comprising an event 'E' with a routing key 'RK' and attribute updates 'AU' can be received by OES storage system 500 to be appended. Accordingly, CAC 530 can, via attribute fetch component 532, access segment attributes of stream attributes corresponding to the AUs for a specific segment. In an aspect, CAC 530 can be comprised in SCC 520, although in other embodiments, CAC 530 can be external to SCC 520, for example CAC 230 can be separate from SCC 220, etc. In an aspect, attribute fetch component 532 can comprise segment identification component 540 that can interact with SCC 520 to identify a segment of an OES corresponding to storage of an event having routing key RK, e.g., SCC 520 can be aware of the topology of an OES, namely what key range each segment of an OES corresponds to. Generally, SCC 520 can also facilitate access to key ranges for segments of the OES in other epochs. Segment attribute(s) for the identified segment can then be accessed via segment-specific attribute fetch component 542, e.g., for each AU attribute a corresponding segment attribute can be fetched for the identified segment, for example via OES attribute component 512. The key RK can be merged with the fetched segment attribute(s) such that the attributes are specifically related to the key RK and thus the identified segment, as an example, RK can be prepended via bitwise concatenation to each segment attribute via $A_i:=\{RK, A_i\}$ for each $A_i$ fetched by segment-specific attribute fetch component 542.

As has been noted elsewhere herein, due to the complicated topology of an OES, attributes for a given segment can reflect some, none, or all of the attributes of related segments of anther epoch. As an example employing OES 201, in epoch 3, segment 6 can be related to segments 5 and 2 of epoch 3, which in turn can be related to segments 1 and 2 of epoch 1. In this example, it can be determined that some, none, or all attributes of segments 1, 2, and 5 can be reflected in segment attributes for segment 6. Where not all attributes of related segments of earlier epochs are reflected in segment 6 in the current epoch, some attribute indicated in AU can be unavailable to be fetched. In an aspect this missing attribute can be missing based on OES design decisions, for example, simply to have lean attribute storage by forcing missing attributes to be fetched from older epochs/segments on an as-needed basis. As such, missing attributes can be accessed from a segment of an older epoch via a missing value resolution operation. This can enable accessing missing attributes that were present in previous epochs, although it cannot enable access to missing attributes that were not present in previous epochs, e.g., if an attribute was never used in an earlier epoch, then said attribute cannot be accessed and the missing attribute can, in some circumstances result in a conditional append failing and throwing an error via conditional append error component 537.

In an aspect, where a segment attribute indicated in AU is missing due to not being accessible via segment-specific attribute fetch component 542, the attribute can be added to a missing attribute list 'MAU' via absent attribute component 544. Accordingly, MAU can comprise a list of all attributes indicated in AU that are not fetched by segment-specific attribute fetch component 542. SCC 520 can be employed to identify a segment of a preceding epoch affiliated with storage of events having key RK, generally this identifies an immediate predecessor segment. MAU can then be employed to fetch segment attributes from this segment of the preceding epoch affiliated with the storage of events having key RK. This can result in fetching some, none, or all missing segment attributes of AU, e.g., those listed in MAU. Where not all segment attributes are fetched, SCC 520 can be employed to again step back to an earlier epoch for a segment storing events having the key RK until all MAU are fetched or until there is no earlier segment storing events having the key RK. The MAU attributes fetched can then be employed in determining the validity of a condition of the current event as before. In an aspect, the MAU attributes can be stored via OES attribute component 512 in relation to the current epoch segment storing events of key RK. However, in some embodiments, fetched MAU attributes can be discarded, for example, where the frequency of appending an event of key RK is low and the number of attributes fetched for MAU is large, it can be less desirable to consume attribute storage space, more especially given that the missing attribute operation can be performed on the relatively few instances of conditionally appending this example event. In an aspect, attribute bridging component 546 can determine which, if any, MAU attributes fetched from previous epochs are to be stored via OES attribute component 512 in relation to the current epoch segment storing events of key RK.

Segment attributes $A_1 \ldots A_n$, after being populated with fetched MAU attributes and after being updated to reflect the key RK, and their corresponding values $V_1 \ldots V_n$ can be employed to enable attribute analysis component 534 to validate each condition indicated in the AUs, for example, where a condition '$C_i$' is indicated in the AUs, $C_i$ and $V_i$ can be analyzed to determine if the condition is satisfied in relation to segment attribute $A_i$, where $A_i:=\{RK, A_i\}$. Where it is determined that the condition is not satisfied, appending the event to the segment is not permitted and can be aborted. Again as before, an absence of an attribute can also be regarded as a condition, for example, an update is permitted if and only if an attribute, e.g., $A_1 \ldots A_n$, does not exist among the AUs. It is again further noted that all conditions of the append must be determined to be satisfied for the event to be permitted. Accordingly, conditional append performance component 536 can facilitate appending the event to the segment, e.g., via write(s) 506. In an aspect, errors can be returned where appending the event to the stream is deemed unpermitted and terminated due to a condition failure. An error(s) can be returned via conditional append error component 537. In an aspect, where a segment attribute, corresponding to an attribute of AU, is missing even after MAU fetching, this can be treated, in some embodiments, as nonconforming and the conditional append can fail, e.g., where the missing value resolution operation was unable to fetch a needed attribute from any epoch, the conditional append can fail. As is noted hereinabove, a missing value resolution operation can be avoided where an absence of an attribute is regarded a condition, while a missing value resolution operation can be performed where an absence of an attribute is not regarded a condition. Subsequently, updates to stream/segment attributes, e.g., stored via OES attribute component 512, etc., can be updated based on AU(s) for the event via attribute update component 538. In an aspect, the event and updated stream/segment attribute(s) can be made visible to other components.

It is noted that a concurrent append can modify one or more attributes of the MAU. This can be resolved by refreshing the segment attributes after all available MAU attributes have been fetched and the conditional append failing due to a mismatch of an attribute value and a condition value. Accordingly, the segment attributes can be refreshed and the append can be reattempted with these more up to date attributes as reflected in MAU and AU. Where the append continues to fail, the append can be rejected and an error thrown, e.g., via conditional append error component 537. However, where the refresh of the attributes resolves the mismatch, the append can proceed.

Figure 6:
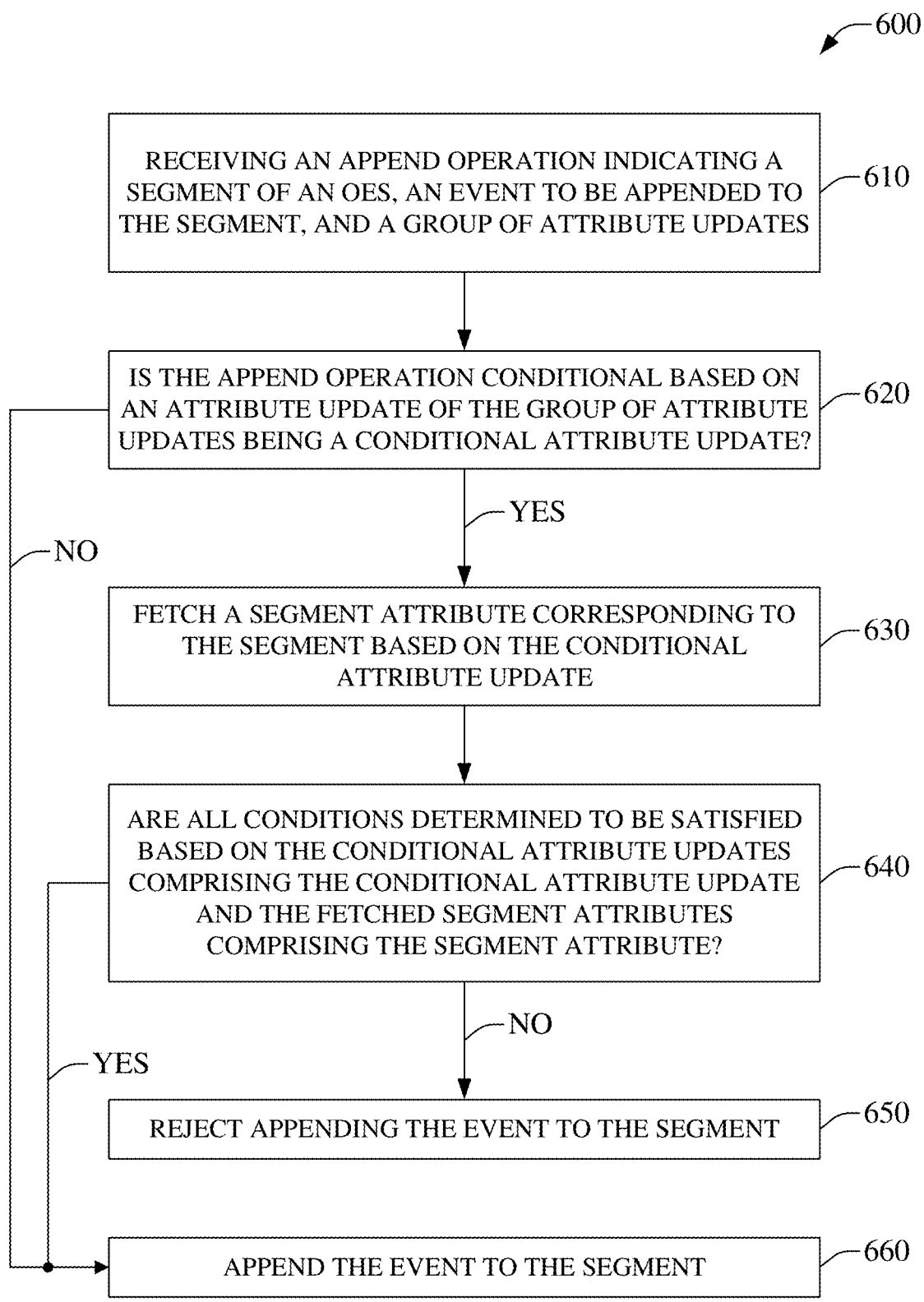
FIG. 6 is an illustration of an example method that can enable a conditional append of an event to a segment of an ordered event stream, in accordance with aspects of the subject disclosure.
Figure 7:
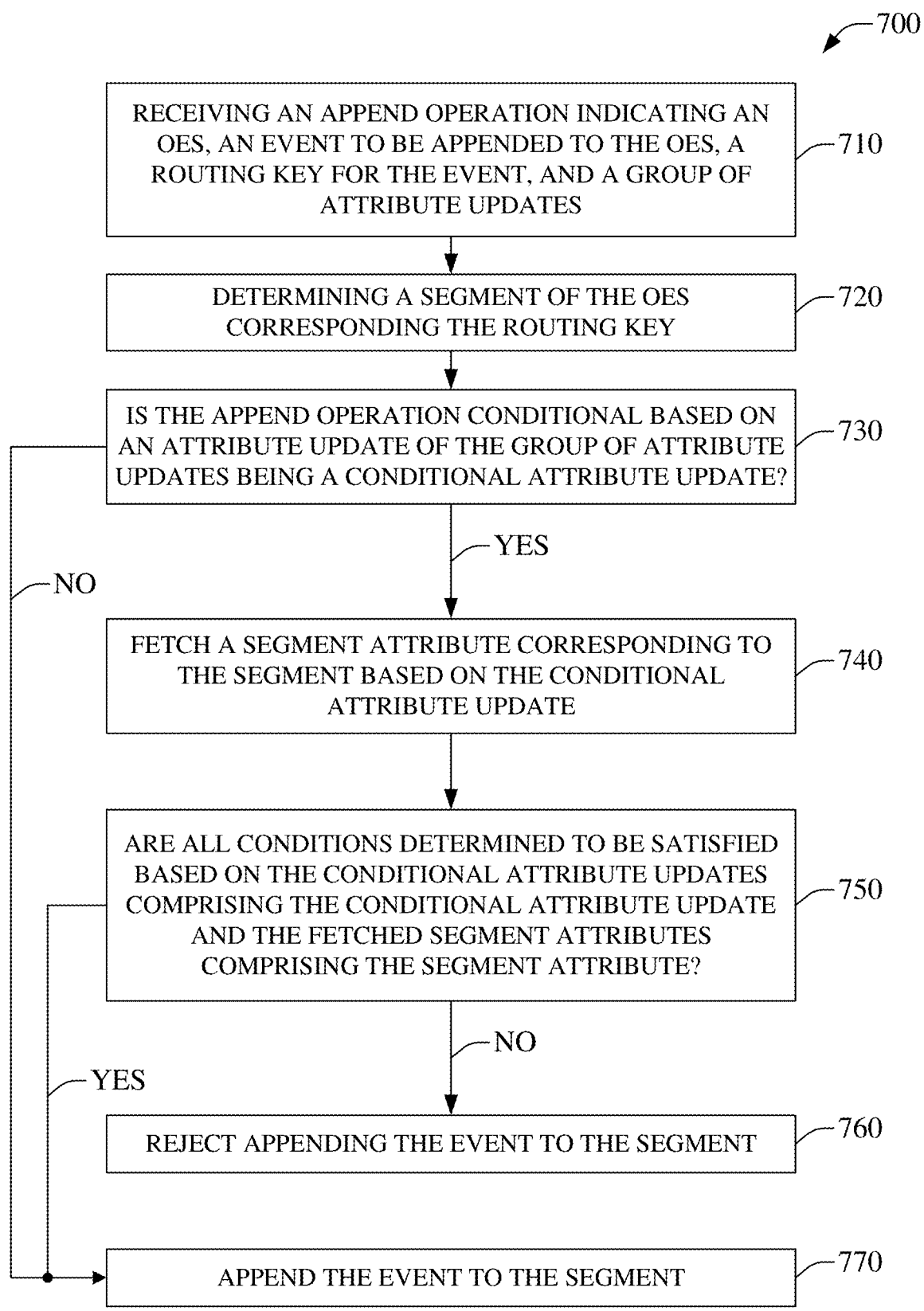
FIG. 7 is an illustration of an example method facilitating a conditional append of an event to a segment of an ordered event stream based on a corresponding segment-specific attribute, in accordance with aspects of the subject disclosure.
Figure 8:
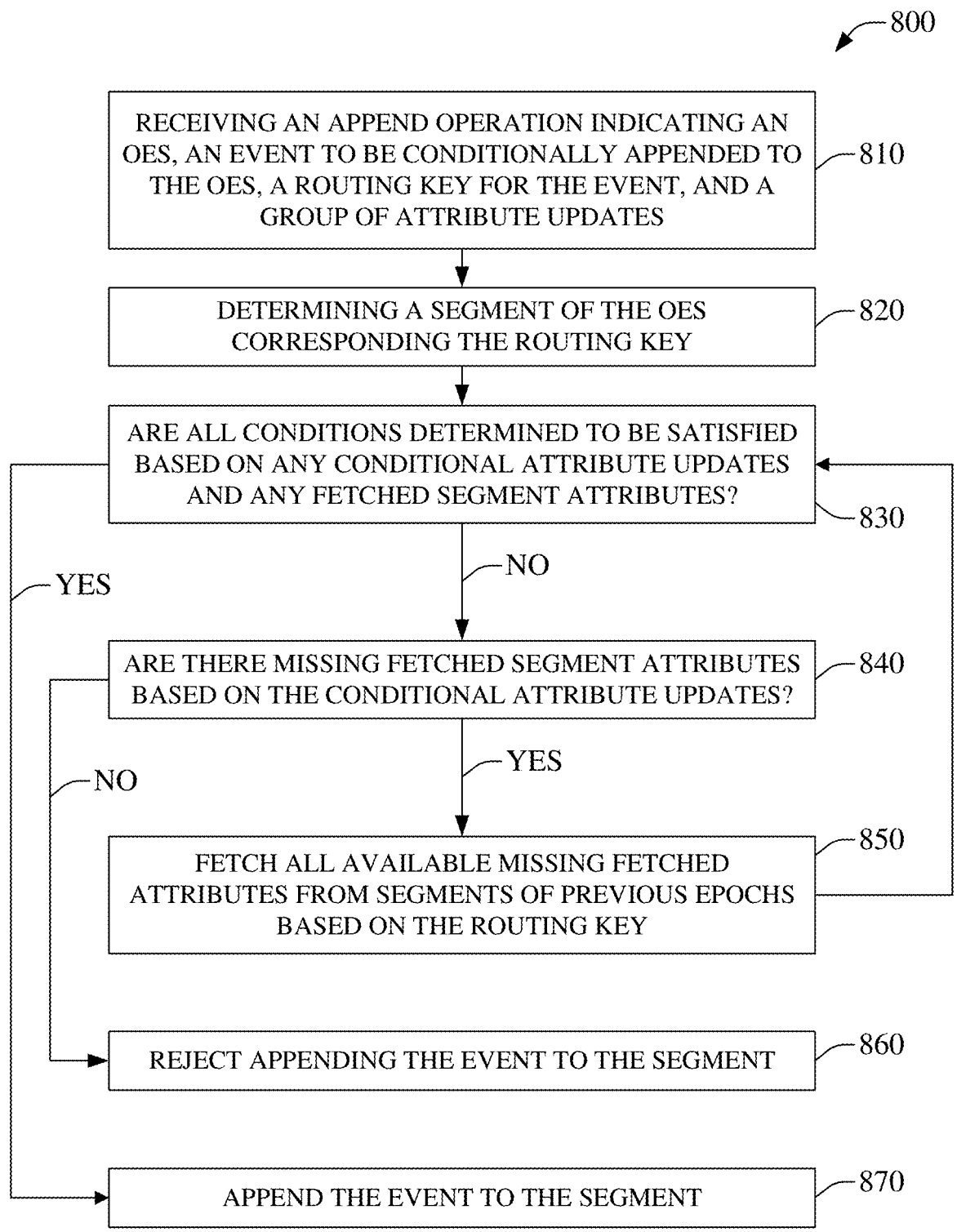
FIG. 8 is an illustration of an example method enabling a conditional append of an event to a segment of an ordered event stream based on a corresponding OES attribute determined via recovering the corresponding OES attribute from a segment of a previous epoch, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate conditionally appending an event to a segment of an ordered event stream, in accordance with aspects of the subject disclosure. At 610, method 600 can comprise receiving an append operation indicating a segment of an OES, an event to be appended to the segment and a group of attribute updates. In an aspect, the append operation can be an unconditional append operation, a composite unconditional append operation, or a composite conditional append operation. An unconditional append operation can occur when the group of attribute updates is empty, e.g., the group of attribute updates does not contain any attribute update values, indications of a condition of the append operation, or other values. Where the attribute updates are empty, there is no condition corresponding to performing the append operation and the event can be permitted to be appended to the section in an otherwise conventional manner.

In an aspect, where the append operation does not comprise an empty group of attribute updates, the append operation can be regarded as a composite append operation that can be of either an unconditional or a conditional type. A composite unconditional append operation can comprise a non-empty group of attributes. The non-empty group of attributes can then be determined to indicate no conditions that must be satisfied before the append of the event is allowed. In contrast, where the non-empty group of attributes is determined to indicate at least one condition that must be satisfied before the append of the event is allowed, the composite append operation can be a composite conditional append operation. All composite appends can assure that both the event payload and the supplied attribute updates can be atomically applied to the OESS segment where the composite append operation is accepted by the OES storage system, e.g., the composite append operation does not fail validation for example due to a failed condition, a missing value, etc. The difference between a conditional and unconditional composite append is that composite conditional appends can further assure that the condition is also atomically verified during determining that the append is acceptable to the OES storage system, e.g., implicitly rejecting the append operation if the condition is not satisfied.

Accordingly, at 620, method 600 can comprise determining if the append operation is conditional based on an attribute update of the group of attribute updates being a conditional attribute update. If the append operation is not a composite conditional append operation, method 600 can advance to append the event to the segment at 660. At this point, method 600 can end. Additionally, where the attribute update is a composite unconditional append operation, e.g., a composite unconditional append operation is not a composite conditional append operation, the attribute updates can be employed to update segment attributes, although this operation is not illustrated in the figure for the sake of clarity and brevity.

Where, at 620, composite conditional append operation is determined, method 600 can, at 630, fetch a segment attribute that can correspond to the segment. The fetch can be based on the conditional attribute update. In an aspect, the segment attribute can correspond to the conditional attribute update and can be stored via OES attribute component 312, 412, 512, etc., alt-OES attribute component 313, etc., or nearly any other component. The segment attribute(s) can thus be stored local to, or remotely from, the segment. The attributes can be stored in nearly any data structure, for example, another OES, as an event of the segment, such as by having a routing key corresponding to segment attribute(s), as a list, as a B+Tree, or some other data structure.

Method 600, at 640, can determine if all conditions of a composite conditional append operation are satisfied, which can be based on the conditional attribute update(s) and the fetched segment attribute(s). As such, for attribute updates $A_1 \ldots A_n$ of the group of append updates that indicate an append operation condition, the corresponding values $V_1 \ldots V_n$ can be retrieved from the segment attribute(s) corresponding to the segment. The values $V_1 \ldots V_n$ can then be employed to determine if each condition $C_i$ is satisfied based on $V_i$, e.g., each $C_i$ can be compared with a corresponding $V_i$ to determine if there is a mismatch, etc. It is noted that a negative condition can also be employed, e.g., the condition can be determined to be satisfied if and only if an attribute does not exist, if the attribute does not match, or any other negative condition. Where all conditions are determined to be satisfied, method 600 can advance to 660 and enable the event to be appended to the segment. At this point, method 600 can end. Where not all conditions are satisfied, method 600 can instead advance to 650 and reject the appending of the event to the segment. At this point, method 600 can end.

FIG. 7 is an illustration of an example method 700, which can facilitate a conditional append of an event to a segment of an ordered event stream based on determining a corresponding segment-specific attribute, in accordance with aspects of the subject disclosure. At 710, method 700 can comprise receiving an append operation indicating an OES, an event to be appended to the OES, a routing key for the event, and a group of attribute updates. The OES can comprise one or more segments that can be stored locally, remotely, or a combination thereof, e.g., the segments of the OES can be distributed among physically discrete locations, for example in different buildings, cites, states, countries, etc. The OES can, in some embodiments, facilitate OES scaling that can result in a count of segments comprising the OES being dynamic, e.g., non-static. The number of OES segments can therefore increase or decrease, for example in OES 201, in epoch 1 there are three segments, e.g., segments 1, 2, and 3, having the illustrated key space distribution, while in epoch 2, there are four segments resulting from a scaling up operation, e.g., segments 2, 3, 4, and 5, and a different key space distribution than in epoch 1, similarly, the transition from epoch 2 to epoch 3 scales down the count of segments from 4 to 3. Moreover, the key space allocated to a segment of the OES can be dynamic, e.g., the range of keys associated with a given segment can change regardless of any change in a count of segments comprising the OES, for example in OES 201, in epoch 1 there are three segments, e.g., segments 1, 2, and 3, having the illustrated key space allocations, while in epoch 3, despite also having three segments, e.g., segments 3, 4, and 6, there is a different key space distribution than in epoch 1.

At 720, a segment of the OES can be determined based on the routing key. An OES storage system can store events in segments based on the routing key and, as such, the routing key can be employed, for example via SCC 120, 220, 320, 420, 520, etc., to determine a segment of the OES that the event will be appended to where the append operation is not otherwise rejected. The SCC can enable adaptation of the OES topology, e.g., changes to the number of segments of an OES, changes to the key space allocated to a segment(s) of an OES, changes to a physical location(s) of storage elements of an OES, and other topological changes to the OES, which can enable the OES to be unbounded and properly ordered. As an example, if an OES is initially deployed on a 10 TB drive as a single segment, an SCC can enable moving the physical storage to a 500 TB drive as the OES grows in size. Continuing the example, the SCC can also enable spanning to other physical drives as storage space continues to grow. In a further aspect of this example, the SCC can facilitate employing other types of storage for older events, such that, for example, 'cold' data is stored remotely in archival chunks by a different type of storage than 'hot' data that is stored in more local flash memory, or other scenarios. As such, an SCC, e.g., SCC 120, 220, 320, 420, 520, etc., can enable method 700 to determine the correct segment of the OES based on the routing key corresponding to the event to be appended.

At 730, it can be determined if the append operation is conditional based on an attribute update of the group of attribute updates being a conditional attribute update. If the append operation is not a composite conditional append operation, method 700 can advance to appending the event to the segment at 770, at which point, method 700 can end. Moreover, where the attribute update is determined to be a composite unconditional append operation, the attribute updates can be employed to update segment attributes, although this operation is again not illustrated in the figure for the sake of clarity and brevity. However, where a composite conditional append operation is determined at 730, method 700 can advance to 740.

Method 700, at 740, can fetch a segment attribute that can correspond to the segment. The fetch can be based on the conditional attribute update. In an aspect, the segment attribute can correspond to the conditional attribute update At 750, method 700 can comprise determining if all conditions of a composite conditional append operation are satisfied. This determination can be based on the conditional attribute update(s) and the fetched segment attribute(s). As is disclosed herein before, for attribute updates $A_1 \ldots A_n$ of the group of append updates that indicate an append operation condition, the corresponding values $V_1 \ldots V_n$ can be retrieved from the segment attribute(s) corresponding to the segment. The values $V_1 \ldots V_n$ can then be employed to determine if each condition $C_i$ is satisfied based on $V_i$, e.g., each $C_i$ can be compared with a corresponding $V_i$ to determine if there is a mismatch, etc. Where all conditions are determined to be satisfied, method 700 can advance to 770 and the event to be allowed to be appended to the segment before method 700 can end. Where not all conditions are satisfied, method 700 can instead advance to 760 and reject the appending of the event to the segment. At this point, method 700 can end.

FIG. 8 is an illustration of an example method 800, which can facilitate conditionally appending an event to a segment of an ordered event stream based on a corresponding OES attribute determined via recovering the corresponding OES attribute from a segment of a previous epoch, in accordance with aspects of the subject disclosure. At 810, method 800 can comprise receiving an append operation indicating an OES, an event to be conditionally appended to the OES, a routing key for the event, and a group of attribute updates. As is noted elsewhere herein, the OES can comprise one or more scalable segments that can be stored locally, remotely, or a combination thereof.

At 820, a segment of the OES can be determined based on the routing key. Again, an OES storage system can store events in segments based on the routing key and, as such, the routing key can be employed, for example via SCC 120, 220, 320, 420, 520, etc., to determine a segment of the OES that the event will be appended to where the append operation is not otherwise rejected. Given that the topology of an OES can be dynamic, one or more attribute policies relating to carrying segment attributes forward across epoch boundaries can be implemented. In an aspect, an attribute policy can result in some, none, or all attributes being carried forward across an epoch boundary of the OES. However, where not all attributes are carried forward between epochs, based on the attribute policies, some attributes specified in the group of attribute updates from 810 can be missing for the segment determined at 820. It is noted that the specifics of determining, implementing, etc., attribute policies are beyond the scope of the instant disclosure and, as such, are not discussed in any detail. However, it is sufficient to note that said attribute policies can result in missing OES/segment attributes in different epochs, e.g., an attribute in a first epoch may not be carried forward to a second epoch, although it can remain stored in relation to, or determinable from, the first epoch. The ability to access attributes for a routing key in an earlier epoch can enable methods, e.g., method 600, 700, 800, etc., to access segment attributes corresponding to conditions indicated in the group of attribute updates, e.g., missing attributes can be fetched from earlier epochs and carried forward, e.g., bridged, into the current epoch to enable determining if the condition is satisfied. In contrast, where attributes from earlier epochs cannot be accessed, the missing attribute cannot be fetched and the condition can be treated as not being satisfied, which can result in rejecting the conditional append of the event.

At 830, it can be determined if all conditions of the conditional append operation are satisfied. This can be based on any conditional attribute updates of the group of attribute updates from 810 and any fetched segment attributes corresponding to the conditional attribute updates. Where all the conditions are determined to be satisfied, method 800 can advance to 870 and permit appending the event to the segment before method 800 can end. However, where not all conditions are determined to be satisfied at 830, method 800 can advance to 840.

At 840, method 800 can comprise determining if there are missing fetched segment attributes. The determining can be based on the conditional attribute updates of the group of attribute updates from 810. As is noted for 820, the dynamic nature of a modern OES can result in a segment not carrying forward all of the attributes of a segment from a previous epoch. Where there are no missing fetched attributes, this can indicate that all segment attributes had been properly fetched and therefore the where all the conditions were also not satisfied at 830, the conditional append operation is defective and method 800 can advance to 860 before ending, enabling method 800 to reject appending the event to the segment. However, where there are missing fetched segment attributes, these missing attributes can be determined from segments in earlier epochs of the OES, as discussed hereinabove. Accordingly, method 800 can advance to 850.

Method 800 can comprise, at 850, fetching all available missing fetched attributes from segments of previous epochs based on the routing key received at 810. In an aspect, this can be performed by recursively checking a next previous epoch segment corresponding to the routing key for a missing fetched attribute while missing fetched attributes remain and until there are no further previous epochs to check. In an aspect, where all missing fetched attributes are successfully fetched from previous epochs, then upon returning to 830, method 800 can either determine that all conditions are satisfied and advance to 870 and append the event before ending, or can again determine that not all conditions are satisfied and can again check to be sure there are still no missing fetched segment attributes by returning to 840. Upon returning to 840, method 800 can determine that there are no missing fetched segments, because all of them were fetched at 850, and therefore can advance to 860 and reject the appending the event to the segment before ending method 800. In an aspect, additional iteration(s) of the 830 to 850 loop of method 800 can be performed before advancing to either 860 or 870 to account for the possibility of some missing fetched segment attributes being missing due to a concurrent epoch change, other concurrent event appending operation, or some other transient system state. It is noted that method 800, at 830, can generally comprise operations that can be the same as, or similar to, 730 to 750 of method 700, 620 to 640 of method 600, or other methods, and that method 800 can add the feature of fetching of missing segment attributes by way of operations 840 to 850. At this point, method 800 can end.

Figure 9:
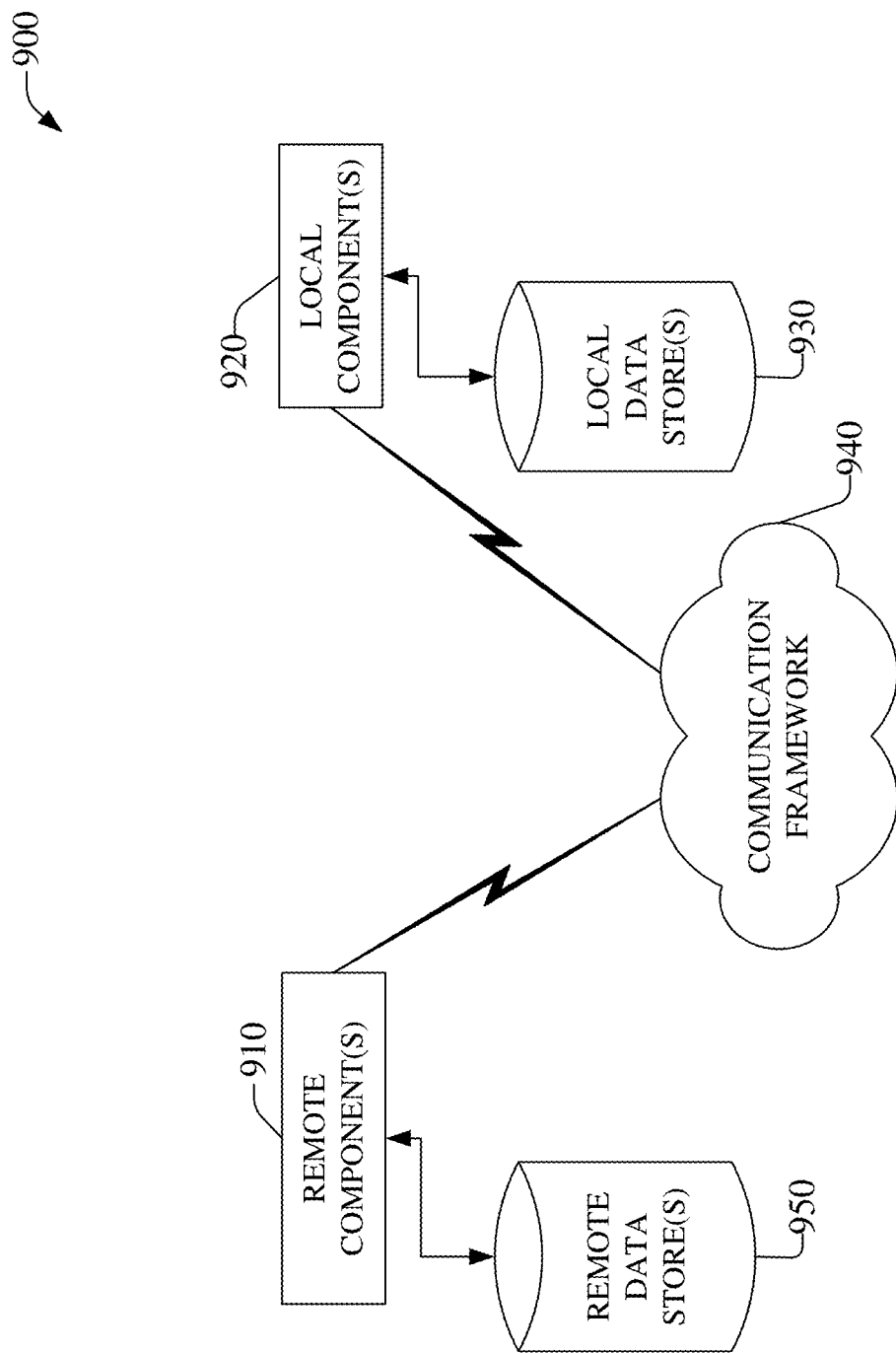
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, 202, 302, 402, 502, etc., a remotely located processor device comprised in processor component 104, 204, 304, 404, 504, etc., a remotely located device comprised in stream control component 120, 220, 320, 420, 520, etc., a remotely located device comprised in conditional append component 130, 230, 330, 430, 530, etc., a remotely located device connected to a local component via communication framework 940, or other remotely located devices. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, 202, 302, 402, 502, etc., a local processor device comprised in processor component 104, 204, 304, 404, 504, etc., a local device comprised in stream control component 120, 220, 320, 420, 520, etc., a local device comprised in conditional append component 130, 230, 330, 430, 530, etc., or other local devices.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, missing attributes can be fetched from earlier epochs, wherein the earlier epochs can be stored locally, remotely, via different types of storage, etc., and, as such, information can be communicated via communication framework 940 among storage components of an OES storage network 100, 200, 300, 400, 500, etc., to facilitate the example fetching, in addition to components of the OES facilitating adapting, altering, modifying, erasing, deleting, freeing, etc., events stored via one or more segments of one or more OES(s), as disclosed herein.

Figure 10:
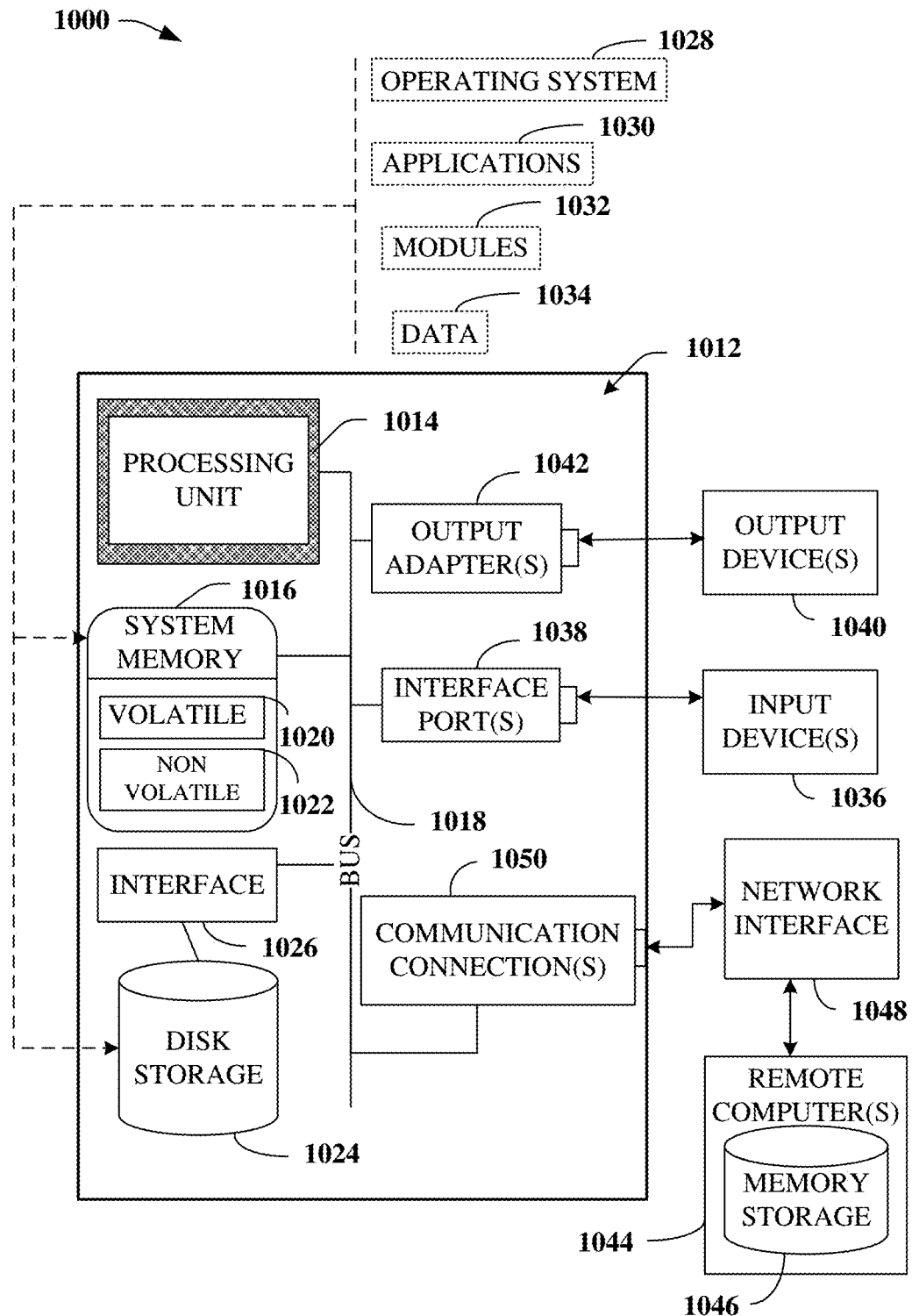
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102-502, etc., processor component 104-504, etc., stream control component 120-520, etc., conditional append component 130-530, etc., or other OES storage system component, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising determining a type of appending operation and, where the type is 1) an unconditional append, allowing writing, 2) a composite unconditional append, allowing writing, and 3) a composite conditional append, determining a condition state based on at least a stream attribute and, where the condition state corresponds to a group of defined conditions having been satisfied, allowing writing of the event, and where the condition state corresponds to at least one of the group of conditions not having been satisfied, prohibiting writing of the event to the segment of the ordered event stream.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (λ) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving an append operation corresponding to writing an event to a segment of an ordered event stream;
in response to determining that the append operation is an unconditional append operation, enabling writing of the event to the segment of the ordered event stream;
in response to determining that the append operation is a composite unconditional append operation based on the append operation comprising a group of attribute updates, wherein the group of attribute updates does not indicate a condition of conditions to be satisfied before permitting writing of the event to the ordered event stream, enabling writing of the event to the segment of the ordered event stream and enabling updating of a stream attribute; and
in response to determining that the append operation is a composite conditional append operation, determining a condition state based on the stream attribute and an attribute update;
in response to the condition state indicating satisfaction of the conditions, enabling writing of the event to the segment of the ordered event stream and enabling updating of stream attributes; and
in response to the condition state indicating that at least one condition of the conditions is not satisfied, prohibiting writing of the event to the segment of the ordered event stream.

2. The system of claim 1, wherein the determining that the append operation is an unconditional append operation is based on the append operation not comprising a group of attribute updates.

3. The system of claim 1, wherein the determining that the append operation is a composite conditional append operation is based on the append operation comprising a group of attribute updates, and wherein the group of attribute updates indicates a condition of the conditions to be satisfied before permitting writing of the event to the ordered event stream.

4. The system of claim 1, wherein the append operation indicates a routing key corresponding to the event, and wherein the segment of the ordered event stream is determined from the routing key.

5. The system of claim 1, wherein the determining the condition state comprises accessing a first segment attribute corresponding to the segment in a first epoch of the ordered event stream.

6. The system of claim 5, wherein the determining the condition state further comprises accessing a second segment attribute corresponding to another segment in a second epoch of the ordered event stream, wherein the second epoch is a different epoch than the first epoch, wherein the first segment attribute corresponds to a routing key, wherein the second segment attribute also corresponds to the routing key, and wherein the second segment attribute is substituted for the first segment attribute.

7. The system of claim 6, wherein the ordered event stream is scalable, enabling a change in a topology of the ordered event stream.

8. The system of claim 7, wherein the change in a topology of the ordered event stream results in a routing key affiliated with a first segment in a first epoch of the ordered event stream being affiliated with a second segment in a second epoch of the ordered event stream, and wherein the first segment is a different segment than the second segment.

9. A method, comprising:
receiving, by a system comprising a processor, an append operation corresponding to appending an event to a segment of an ordered event stream, wherein the append operation indicates an event and a routing key that corresponds to the event;

in response to determining that the append operation is an unconditional append operation, permitting, by the system, appending of the event to the segment of the ordered event stream;

in response to determining that the append operation is a composite unconditional append operation based on the append operation comprising a group of attribute updates, wherein the group of attribute updates does not indicate a condition of conditions to be satisfied before permitting writing of the event to the ordered event stream, permitting, by the system, appending of the event to the segment of the ordered event stream; and in response to determining that the append operation is a composite conditional append operation, determining, by the system, a condition state based on a stream attribute and an attribute update of the attribute updates;

in response to the condition state indicating that conditions have been satisfied, permitting, by the system, appending of the event to the segment of the ordered event stream; and in response to the condition state indicating that at least one of the conditions is not satisfied, prohibiting, by the system, appending of the event to the segment of the ordered event stream.

10. The method of claim 9, wherein the determining that the append operation is an unconditional append operation comprises determining that the append operation does not comprise a group of attribute updates.

11. The method of claim 9, wherein the determining that the append operation is a composite conditional append operation comprises determining the append operation indicates a group of attribute updates that indicate at least one condition to be satisfied before permitting appending of the event to the ordered event stream.

12. The method of claim 9, further comprising determining, by the system, the segment of the ordered event stream based on the routing key.

13. The method of claim 9, wherein the determining the condition state comprises a first seeking, by the system, of a first segment attribute corresponding to the segment in a first epoch of the ordered event stream, and a second seeking of a second segment attribute corresponding to another segment in a second epoch of the ordered event stream, wherein the second epoch is a different epoch than the first epoch, wherein the first segment attribute corresponds to the routing key, wherein the second segment attribute also corresponds to the routing key, and wherein the second segment attribute is substituted for the first segment attribute in response to the first segment attribute not being fetched as a result of the first seeking and the second segment attribute being fetched as a result of the second seeking.

14. The method of claim 9, wherein the operations further comprise supporting, by the system, a change in a topology of the ordered event stream where the ordered event stream is determined to be scalable.

15. The method of claim 14, wherein the change in the topology of the ordered event stream comprises affiliating, by the system, a routing key of a first segment in a first epoch of the ordered event stream being with a second segment in a second epoch of the ordered event stream.

16. The method of claim 14, wherein the first segment is a different segment than the second segment.

17. A non-transitory machine-readable medium, comprising executable instructions that, when executed by a processor, facilitate performance of operations, comprising:

in response to receiving an append operation corresponding to appending an event to a segment of an ordered event stream, determining a type of the append operation, wherein the append operation indicates an event and a routing key;

where the type of the append operation is an unconditional append operation type, allowing writing of the event to the segment of the ordered event stream;

where the type of the append operation is a composite unconditional append operation type, allowing writing of the event to the segment of the ordered event stream based on the append operation comprising a group of attribute updates, wherein the group of attribute updates does not indicate a condition of conditions to be satisfied before permitting writing of the event to the ordered event stream; and where the type of the append operation is a composite conditional append operation type, determining a condition state based on a stream attribute and an attribute update of the attribute updates;

where the condition state corresponds to a group of defined conditions having been satisfied, allowing writing of the event to the segment of the ordered event stream; and where the condition state corresponds to at least one of the group of conditions not having been satisfied, prohibiting writing of the event to the segment of the ordered event stream.

18. The non-transitory machine-readable medium of claim 17, wherein the determining that the append operation is an unconditional append operation comprises determining that the append operation does not comprise a group of attribute updates.

19. The non-transitory machine-readable medium of claim 17, wherein the determining that the append operation is a composite conditional append operation comprises determining the append operation indicates a group of attribute updates indicating at least one condition to be satisfied as a prerequisite to appending of the event to the ordered event stream.

20. The non-transitory machine-readable medium of claim 17, wherein the determining the condition state comprises a first attempt to access a first segment attribute corresponding to the segment in a first epoch of the ordered event stream, and a second attempt to access a second segment attribute corresponding to another segment in a second epoch of the ordered event stream, wherein the second epoch is a different epoch than the first epoch, wherein the first segment attribute corresponds to the routing key, wherein the second segment attribute also corresponds to the routing key, and wherein the second segment attribute is substituted for the first segment attribute in response to the first segment attribute not being fetched as a result of the first attempt to access and the second segment attribute being fetched as a result of the second attempt to access.

* * * * *